US010102258B2

(12) United States Patent
Jacob et al.

(10) Patent No.: US 10,102,258 B2
(45) Date of Patent: Oct. 16, 2018

(54) COLLABORATIVE DATASET CONSOLIDATION VIA DISTRIBUTED COMPUTER NETWORKS

(71) Applicants: Bryon Kristen Jacob, Austin, TX (US); David Lee Griffith, Austin, TX (US); Triet Minh Le, Austin, TX (US); Arthur Albert Keen, Austin, TX (US); Alexander John Zelenak, Austin, TX (US); Jon Loyens, Austin, TX (US); Brett A. Hurt, Austin, TX (US); Shad William Reynolds, Austin, TX (US); Joseph Boutros, Austin, TX (US)

(72) Inventors: Bryon Kristen Jacob, Austin, TX (US); David Lee Griffith, Austin, TX (US); Triet Minh Le, Austin, TX (US); Arthur Albert Keen, Austin, TX (US); Alexander John Zelenak, Austin, TX (US); Jon Loyens, Austin, TX (US); Brett A. Hurt, Austin, TX (US); Shad William Reynolds, Austin, TX (US); Joseph Boutros, Austin, TX (US)

(73) Assignee: data.world, Inc., Austin, TX (US)

( * ) Notice: Subject to any disclaimer, the term of this patent is extended or adjusted under 35 U.S.C. 154(b) by 248 days.

(21) Appl. No.: 15/186,514

(22) Filed: Jun. 19, 2016

(65) Prior Publication Data

US 2017/0364569 A1    Dec. 21, 2017

(51) Int. Cl.
*G06F 17/30* (2006.01)

(52) U.S. Cl.
CPC .. *G06F 17/30545* (2013.01); *G06F 17/30303* (2013.01)

(58) Field of Classification Search
CPC ........................................................ G06F 21/34
(Continued)

(56) References Cited

U.S. PATENT DOCUMENTS 6,317,752 B1    11/2001    Lee et al.
7,853,081 B2    12/2010    Thint
(Continued)

FOREIGN PATENT DOCUMENTS

WO    2017190153 A1    11/2017
WO    2017222927 A1    12/2017

OTHER PUBLICATIONS

Griffith et al., "Aggregation of Ancillary Data Associated With Source Data in a System of Networked Collaborative Datasets," U.S. Appl. No. 15/927,006, filed Mar. 20, 2018.
(Continued)

*Primary Examiner* — Kim T Nguyen
(74) *Attorney, Agent, or Firm* — Kokka & Backus, PC

(57) ABSTRACT

Various embodiments relate generally to data science and data analysis, computer software and systems, and wired and wireless network communications to provide an interface between repositories of disparate datasets and computing machine-based entities that seek access to the datasets, and, more specifically, to a computing and data storage platform that facilitates consolidation of one or more datasets, whereby a collaborative data layer and associated logic facilitate, for example, efficient access to, and implementation of, collaborative datasets. In some examples, a method may include receiving data representing a query into a collaborative dataset consolidation system, identifying datasets relevant to the query, generating one or more queries to access disparate data repositories, and retrieving data representing query results. In some cases, one or more queries are applied (e.g., as a federated query) to atomized datasets stored in one or more atomized data stores, at least two of which may be different.

6 Claims, 16 Drawing Sheets

(58) Field of Classification Search
USPC .................................................. 707/705, 770
See application file for complete search history.

(56) References Cited

U.S. PATENT DOCUMENTS

| | | | |
|---|---|---|---|
| 8,616,443 | B2 | 12/2013 | Butt et al. |
| 8,831,070 | B2 | 9/2014 | Huang et al. |
| 8,990,236 | B2* | 3/2015 | Mizrahy ............ G06F 17/30734 707/759 |
| 9,002,860 | B1 | 4/2015 | Ghemawat |
| 9,696,981 | B2 | 7/2017 | Martin et al. |
| 2002/0143755 | A1 | 10/2002 | Wynblatt et al. |
| 2006/0218024 | A1* | 9/2006 | Lulla ....................... G06Q 10/02 705/5 |
| 2006/0235837 | A1 | 10/2006 | Chong et al. |
| 2009/0132474 | A1 | 5/2009 | Ma et al. |
| 2009/0150313 | A1 | 6/2009 | Heilper et al. |
| 2009/0157630 | A1 | 6/2009 | Yuan |
| 2009/0234799 | A1 | 9/2009 | Betawadkar-Norwood et al. |
| 2009/0300054 | A1 | 12/2009 | Fisher et al. |
| 2010/0235384 | A1 | 9/2010 | Itai et al. |
| 2010/0250577 | A1 | 9/2010 | Cao et al. |
| 2012/0154633 | A1 | 6/2012 | Rodriguez |
| 2012/0278902 | A1 | 11/2012 | Martin et al. |
| 2012/0284301 | A1* | 11/2012 | Mizrahy ............ G06F 17/30734 707/769 |
| 2012/0310674 | A1 | 12/2012 | Faulkner et al. |
| 2012/0330979 | A1 | 12/2012 | Elson et al. |
| 2013/0031364 | A1 | 1/2013 | Glew et al. |
| 2013/0110775 | A1 | 5/2013 | Forsythe |
| 2013/0156348 | A1* | 6/2013 | Irani ................. G06F 17/30244 382/305 |
| 2014/0006448 | A1 | 1/2014 | McCall |
| 2014/0019426 | A1 | 1/2014 | Palmer |
| 2014/0214857 | A1 | 7/2014 | Srinivasan et al. |
| 2014/0279640 | A1 | 9/2014 | Moreno et al. |
| 2015/0081666 | A1 | 3/2015 | Long |
| 2015/0095391 | A1 | 4/2015 | Gajjar et al. |
| 2015/0234884 | A1 | 8/2015 | Henriksen |
| 2015/0269223 | A1 | 9/2015 | Miranker et al. |
| 2016/0063017 | A1 | 3/2016 | Bartlett et al. |
| 2016/0117362 | A1 | 4/2016 | Bagehorn et al. |
| 2016/0132572 | A1 | 5/2016 | Chang et al. |
| 2016/0314143 | A1 | 10/2016 | Hiroshige |
| 2016/0321316 | A1 | 11/2016 | Pennefather et al. |
| 2017/0053130 | A1* | 2/2017 | Hughes ............... G06F 21/6227 |
| 2017/0132401 | A1* | 5/2017 | Gopi ....................... G06F 21/34 |
| 2017/0161323 | A1 | 6/2017 | Simitsis et al. |
| 2017/0228405 | A1 | 8/2017 | Ward et al. |
| 2017/0316070 | A1 | 11/2017 | Krishnan et al. |
| 2017/0364538 | A1 | 12/2017 | Jacob et al. |
| 2017/0364539 | A1 | 12/2017 | Jacob et al. |
| 2017/0364553 | A1 | 12/2017 | Jacob et al. |
| 2017/0364564 | A1 | 12/2017 | Jacob et al. |
| 2017/0364568 | A1 | 12/2017 | Reynolds et al. |
| 2017/0364570 | A1 | 12/2017 | Jacob et al. |
| 2017/0364694 | A1 | 12/2017 | Jacob et al. |
| 2017/0364703 | A1* | 12/2017 | Jacob .................. G06F 21/6227 |
| 2017/0371881 | A1* | 12/2017 | Reynolds ............ G06F 17/3056 |

OTHER PUBLICATIONS

Griffith et al., "Data Ingestion to Generate Layered Dataset Interrelations to Form a System of Networked Collaborative Datasets," U.S. Appl. No. 15/926,999, filed Mar. 20, 2018.

Griffith et al., "Layered Data Generation and Data Remediation to Facilitate Formation of Interrelated Data in a System of Networked Collaborative Datasets," U.S. Appl. No. 15/927,004, filed Mar. 20, 2018.

Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.

Griffith et al., "Transmuting Data Associations Among Data Arrangements to Facilitate Data Operations in a System of Networked Collaborative Datasets," U.S. Appl. No. 15/943,629, filed Apr. 2, 2018.

Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.

Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.

Reynolds et al., "Computerized Tools to Discover, Form, and Analyze Dataset Interrelations Among a System of Networked Collaborative Datasets," International Patent Application No. PCT/US2018/020812 filed Mar. 3, 2018.

Reynolds et al., "Interactive Interfaces to Present Data Arrangement Overviews and Summarized Dataset Attributes for Collaborative Datasets," U.S. Appl. No. 15/454,969, filed Mar. 9, 2017.

Young, Lee W., International Searching Authority, Notification of Transmittal of the International Search Report and the Written Opinion of the International Searching Authority, or the Declaration for International Patent Application No. PCT/US2017/037846, dated Nov. 9, 2017.

Boutros et al., "Computerized Tools to Develop and Manage Data-Driven Projects Collaboratively Via a Networked Computing Platform and Collaborative Datasets," U.S. Appl. No. 15/985,702, filed May 22, 2018.

Boutros et al., "Computerized Tools to Facilitate Data Project Development Via Data Access Layering Logic in a Networked Computing Platform Including Collaborative Datasets," U.S. Appl. No. 15/985,704, filed May 22, 2018.

Boutros et al., "Dynamic Composite Data Dictionary to Facilitate Data Operations Via Computerized Tools Configured to Access Collaborative Datasets in a Networked Computing Platform," U.S. Appl. No. 15/985,705, filed May 22, 2018.

Boutros et al., "Graphical User Interface for a Display Screen or Portion Thereof," U.S. Appl. No. 29/648,465, filed May 22, 2018.

Boutros et al., "Graphical User Interface for a Display Screen or Portion Thereof," U.S. Appl. No. 29/648,466, filed May 22, 2018.

Boutros et al., "Graphical User Interface for a Display Screen or Portion Thereof," U.S. Appl. No. 29/648,467, filed May 22, 2018.

Copenheaver, Blaine R., Notification of Transmittal of the International Search Report and the Written Opinion of the International Searching Authority, or the Declaration dated Jul. 5, 2017 for International Patent Application No. PCT/US2017/030474.

Hoang, Hau Hai, Non-Final Office Action dated May 3, 2018 for U.S. Appl. No. 15/186,515.

Joshi, Amit Krishna et al., "Alignment-based Querying of Linked Open Data," Lecture Notes in Computer Science, 7566, 807-824, 2012.

Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.

Krishnan et al., U.S. Appl. No. 15/583,966, filed May 1, 2017 and titled "Automatic Generation of Structured Data from Semi-Structured Data."

Martin et al., U.S. Appl. No. 13/457,925, filed Apr. 27, 2012 and titled "Incremental Deployment of Computer Software Program Logic."

Martin et al., U.S. Appl. No. 61/479,621, filed Apr. 27, 2011 and titled "Incremental Deployment of Computer Software Program Logic."

Parashar et al., U.S. Appl. No. 62/329,982, filed Apr. 29, 2016 and titled "Automatic Parsing of Semi-Structured Data and Identification of Missing Delimiters."

Skevakis, Giannis et al., Metadata management, interoperability and Linked Data publishing support for Natural History Museums, Int J Digit Libr (2014), published online: Apr. 11, 2014; Springer-Verlag Berlin Heidelberg.

Young, Lee W., Notification of Transmittal of the International Search Report and the Written Opinion of the International Search-

(56) References Cited

OTHER PUBLICATIONS ing Authority, or the Declaration dated May 29, 2018 for International Patent Application No. PCT/US2018/018906.
Bullock, Joshua, Non-Final Office Action dated Jul. 12, 2018 for U.S. Appl. No. 15/186,517.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Raab, Christopher J., Non-Final Office Action dated Jun. 28, 2018 for U.S. Appl. No. 15/186,520.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.

* cited by examiner

COLLABORATIVE DATASET CONSOLIDATION VIA DISTRIBUTED COMPUTER NETWORKS

FIELD

Various embodiments relate generally to data science and data analysis, computer software and systems, and wired and wireless network communications to provide an interface between repositories of disparate datasets and computing machine-based entities that seek access to the datasets, and, more specifically, to a computing and data storage platform that facilitates consolidation of one or more datasets, whereby a collaborative data layer and associated logic facilitate, for example, efficient access to collaborative datasets.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide the ability to store the increasing amounts of generated data. Consequently, traditional data storage and computing technologies have given rise to a phenomenon numerous desperate datasets that have reached sizes (e.g., including trillions of gigabytes of data) and complexity that tradition data-accessing and analytic techniques are generally not well-suited for assessing conventional datasets.

Conventional technologies for implementing datasets typically rely on different computing platforms and systems, different database technologies, and different data formats, such as CSV, HTML, JSON, XML, etc. Further, known data-distributing technologies are not well-suited to enable interoperability among datasets. Thus, many typical datasets are warehouses or otherwise reside in conventional data stores as "data silos," which describe insulated data systems and datasets that are generally incompatible or inadequate to facilitate data interoperability. Moreover, corporate-generated datasets generally may reside in data silos to preserve commercial advantages, even though the sharing of some of the corporate-generated datasets may provide little to no commercial disadvantage and otherwise might provide public benefits if shared altruistically. Additionally, academia-generated datasets also may generally reside in data silos due to limited computing and data system resources and to preserve confidentiality prior to publications of, for example, journals and other academic research papers. While researchers may make their data for available after publication, the form of the data and datasets are not well-suited for access and implementation with other sources of data.

Conventional approaches to provide dataset generation and management, while functional, suffer a number of other drawbacks. For example, individuals or organizations, such as non-profit organizations, usually have limited resources and skills to operate the traditional computing and data systems, thereby hindering their access to information that might otherwise provide tremendous benefits. Also, creators of datasets tend to do so for limited purposes, and once the dataset is created, knowledge related to the sources of data and the manner of constructing the dataset is lost. In other examples, some conventional approaches provide remote data storage (e.g., "cloud"-based data storage) to collect differently-formatted repositories of data, however, these approaches are not well-suited to resolve sufficiently the drawbacks of traditional techniques of dataset generation and management.

Thus, what is needed is a solution for facilitating techniques to generate, locate, and access datasets, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
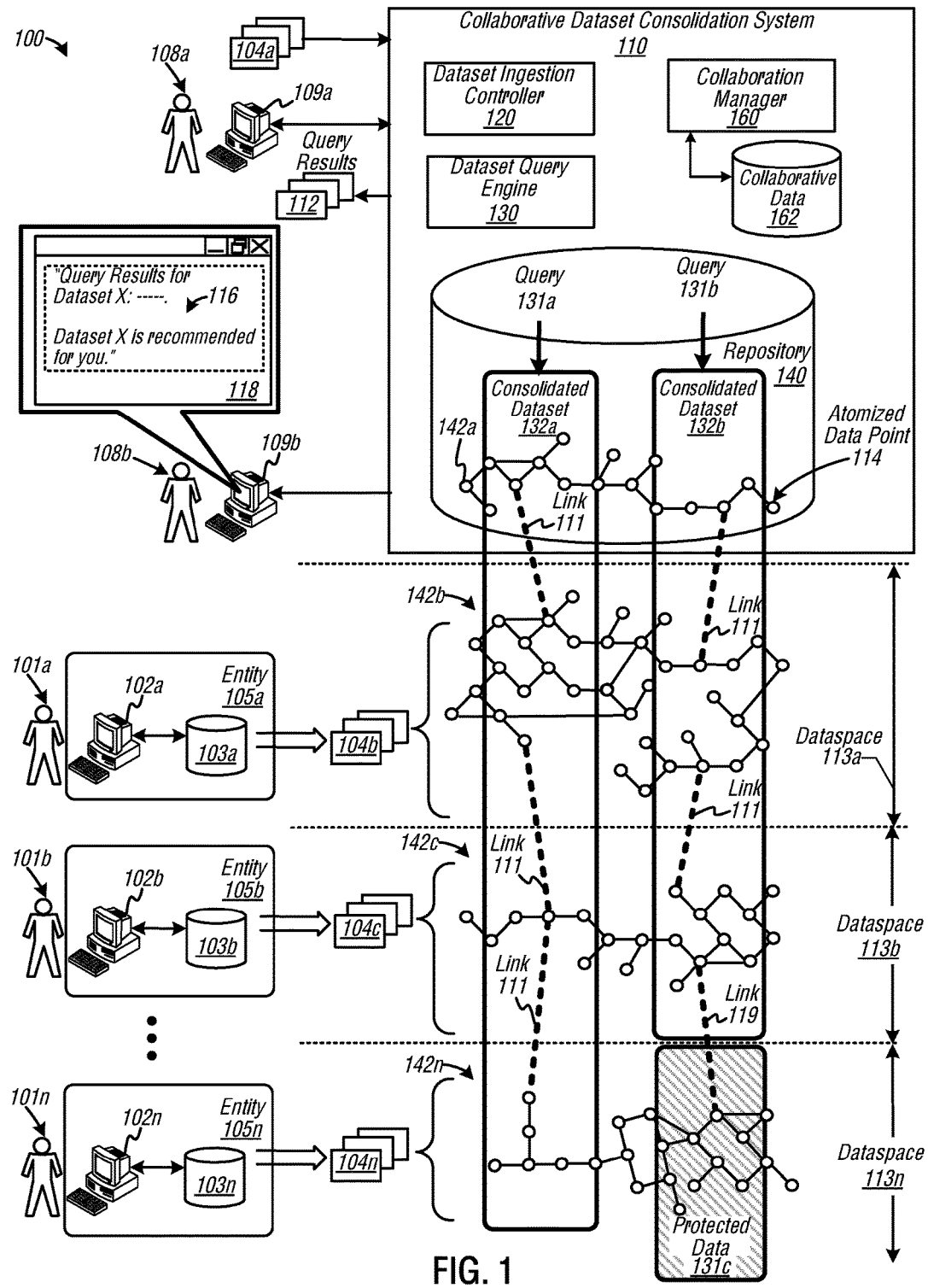
FIG. 1 is a diagram depicting a collaborative dataset consolidation system, according to some embodiments.

FIG. 1 is a diagram depicting a collaborative dataset consolidation system, according to some embodiments. Diagram 100 depicts an example of collaborative dataset consolidation system 110 that may be configured to consolidate one or more datasets to form collaborative datasets. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets, whereby attribute data may be used to determine correlations (e.g., data patterns, trends, etc.) among the collaborative datasets. Collaborative dataset consolidation system 110 may then present the correlations via computing devices 109a and 109b to disseminate dataset-related information to one or more users 108a and 108b. Thus, a community of users 108, as well as any other participating user, may discover and share dataset-related information of interest in association with collaborative datasets. Collaborative datasets, with or without associated dataset attribute data, may be used to facilitate easier collaborative dataset interoperability among sources of data that may be differently formatted at origination. According to various embodiments, one or more structural and/or functional elements described in FIG. 1, as well as below, may be implemented in hardware or software, or both.

Collaborative dataset consolidation system 110 is depicted as including a dataset ingestion controller 120, a dataset query engine 130, a collaboration manager 160, a collaborative data repository 162, and a data repository 140, according to the example shown. Dataset ingestion controller 120 may be configured to receive data representing a dataset 104a having, for example, a particular data format (e.g., CSV, XML, JSON, XLS, MySQL, binary, etc.), and may be further configured to convert dataset 104a into a collaborative data format for storage in a portion of data arrangement 142a in repository 140. According to some embodiments, a collaborative data format may be configured to, but need not be required to, format converted dataset 104a as an atomized dataset. An atomized dataset may include a data arrangement in which data is stored as an atomized data point 114 that, for example, may be an irreducible or simplest representation of data that may be linkable to other atomized data points, according to some embodiments. Atomized data point 114 may be implemented as a triple or any other data relationship that expresses or implements, for example, a smallest irreducible representation for a binary relationship between two data units. As atomized data points may be linked to each other, data arrangement 142a may be represented as a graph, whereby the converted dataset 104a (i.e., atomized dataset 104a) forms a portion of the graph. In some cases, an atomized dataset facilitates merging of data irrespective of whether, for example, schemas or applications differ.

Further, dataset ingestion controller 120 may be configured to identify other datasets that may be relevant to dataset 104a. In one implementation, dataset ingestion controller 120 may be configured to identify associations, links, references, pointers, etc. that may indicate, for example, similar subject matter between dataset 104a and a subset of other datasets (e.g., within or without repository 140). In some examples, dataset ingestion controller 120 may be configured to correlate dataset attributes of an atomized data set with other atomized datasets or non-atomized datasets. Dataset ingestion controller 120 or other any other component of collaborative dataset consolidation system 110 may be configured to format or convert a non-atomized dataset (or any other differently-formatted dataset) into a format similar to that of converted dataset 104a). Therefore, dataset ingestion controller 120 may determine or otherwise use associations to consolidate datasets to form, for example, consolidated datasets 132a and consolidated datasets 132b.

As shown in diagram 100, dataset ingestion controller 120 may be configured to extend a dataset (i.e., the converted dataset 104a stored in data arrangement 142a) to include, reference, combine, or consolidate with other datasets within data arrangement 142a or external thereto. Specifically, dataset ingestion controller 120 may extend an atomized dataset 104a to form a larger or enriched dataset, by associating or linking (e.g., via links 111) to other datasets, such as external entity datasets 104b, 104c, and 104n, form one or more consolidated datasets. Note that external entity datasets 104b, 104c, and 104n may be converted to form external datasets atomized datasets 142b, 142c, and 142n, respectively. The term "external dataset," at least in this case, can refer to a dataset generated externally to system 110 and may or may not be formatted as an atomized dataset.

As shown, different entities 105a, 105b, and 105n each include a computing device 102 (e.g., representative of one or more servers and/or data processors) and one or more data storage devices 103 (e.g., representative of one or more database and/or data store technologies). Examples of entities 105a, 105b, and 105n include individuals, such as data scientists and statisticians, corporations, universities, governments, etc. A user 101a, 101b, and 101n (and associated user account identifiers) may interact with entities 105a, 105b, and 105n, respectively. Each of entities 105a, 105b, and 105n may be configured to perform one or more of the following: generating datasets, modifying datasets, querying datasets, analyzing datasets, hosting datasets, and the like, whereby one or more entity datasets 104b, 104c, and 104n may be formatted in different data formats. In some cases, these formats may be incompatible for implementation with data stored in repository 140. As shown, differently-formatted datasets 104b, 104c, and 104n may be converted into atomized datasets, each of which is depicted in diagram 100 as being disposed in a dataspace. Namely, atomized datasets 142b, 142c, and 142n are depicted as residing in dataspaces 113a, 113b, and 113n, respectively. In some examples, atomized datasets 142b, 142c, and 142n may be represented as graphs.

According to some embodiments, atomized datasets 142b, 142c, and 142n may be imported into collaborative dataset consolidation system 110 for storage in one or more repositories 140. In this case, dataset ingestion controller 120 may be configured to receive entity datasets 104b, 104c, and 104n for conversion into atomized datasets, as depicted in corresponding dataspaces 113a, 113b, and 113n. Collaborative data consolidation system 110 may store atomized datasets 142b, 142c, and 142n in repository 140 (i.e., internal to system 110) or may provide the atomized datasets for storage in respective entities 105a, 105b, and 105n (i.e., without or external to system 110). Alternatively, any of entities 105a, 105b, and 105n may be configured to convert entity datasets 104b, 104c, and 104n and store corresponding atomized datasets 142b, 142c, and 142n in one or more data storage devices 103. In this case, atomized datasets 142b, 142c, and 142n may be hosted for access by dataset ingestion controller 120 for linking via links 111 to extend datasets with data arrangement 142a.

Thus, collaborative dataset consolidation system 110 is configured to consolidate datasets from a variety of different sources and in a variety of different data formats to form consolidated datasets 132a and 132b. As shown, consolidated dataset 132a extends a portion of dataset in data arrangement 142a to include portions of atomized datasets 142b, 142c, and 142n via links 111, whereas consolidated dataset 132b extends another portion of a dataset in data arrangement 142a to include other portions of atomized datasets 142b and 142c via links 111. Note that entity dataset 104n includes a secured set of protected data 131c that may require a level of authorization or authentication to access. Without authorization, link 119 cannot be implemented to access protected data 131c. For example, user 101n may be a system administrator that may program computing device 102n to require authorization to gain access to protected data 131c. In some cases, dataset ingestion controller 120 may or may not provide an indication that link 119 exists based on whether, for example, user 108a has authorization to form a consolidated dataset 132b to include protected data 131c.

Dataset query engine 130 may be configured to generate one or more queries, responsive to receiving data representing one or more queries via computing device 109a from user 108a. Dataset query engine 130 is configured to apply query data to one or more collaborative datasets, such as consolidated dataset 132a and consolidated dataset 132b, to access the data therein to generate query response data 112, which may be presented via computing device 109a to user 108a. According to some examples, dataset query engine 130 may be configured to identify one or more collaborative datasets subject to a query to either facilitate an optimized query or determine authorization to access one or more of the datasets, or both. As to the latter, dataset query engine 130 may be configured to determine whether one of users 108a and 108b is authorized to include protected data 131c in a query of consolidated dataset 132b, whereby the determination may be made at the time (or substantially at the time) dataset query engine 130 identifies one or more datasets subject to a query.

Collaboration manager 160 may be configured to assign or identify one or more attributes associated with a dataset, such as a collaborative dataset, and may be further configured to store dataset attributes as collaborative data in repository 162. Examples of dataset attributes include, but are not limited to, data representing a user account identifier, a user identity (and associated user attributes, such as a user first name, a user last name, a user residential address, a physical or physiological characteristics of a user, etc.), one or more other datasets linked to a particular dataset, one or more other user account identifiers that may be associated with the one or more datasets, data-related activities associated with a dataset (e.g., identity of a user account identifier associated with creating, modifying, querying, etc. a particular dataset), and other similar attributes. Another example of a dataset attribute is a "usage" or type of usage associated with a dataset. For instance, a virus-related dataset (e.g., Zika dataset) may have an attribute describing usage to understand victim characteristics (i.e., to determine a level of susceptibility), an attribute describing usage to identify a vaccine, an attribute describing usage to determine an evolutionary history or origination of the Zika, SARS, MERS, HIV, or other viruses, etc. Further, collaboration manager 160 may be configured to monitor updates to dataset attributes to disseminate the updates to a community of networked users or participants. Therefore, users 108a and 108b, as well as any other user or authorized participant, may receive communications (e.g., via user interface) to discover new or recently-modified dataset-related information in real-time (or near real-time).

In view of the foregoing, the structures and/or functionalities depicted in FIG. 1 illustrate a dataset consolidated system that may be configured to consolidate datasets originating in different data formats with different data technologies, whereby the datasets (e.g., as collaborative datasets) may originate external to the system. Collaborative dataset consolidation system 110, therefore, may be configured to extend a dataset beyond its initial quantity and quality (e.g., types of data, etc.) of data to include data from other datasets (e.g., atomized datasets) linked to the dataset to form a consolidated dataset. Note that while a consolidated dataset may be configured to persist in repository 140 as a contiguous dataset, collaborative dataset consolidation system 110 is configured to store at least one of atomized datasets 142a, 142b, 142c, and 142n (e.g., one or more of atomized datasets 142a, 142b, 142c, and 142n may be stored internally or externally) as well data representing links 111. Hence, at a given point in time (e.g., during a query), the data associated one of atomized datasets 142a, 142b, 142c, and 142n may be loaded into an atomic data store against which the query can be performed. Therefore, collaborative dataset consolidation system 110 need not be required to generate massive graphs based on numerous datasets, but rather, collaborative dataset consolidation system 110 may create a graph based on a consolidated dataset in one operational state (of a number of operational states), and can be partitioned in another operational state (but can be linked via links 111 to form the graph). In some cases, different graph portions may persist separately and may be linked together when loaded into a data store to provide resources for a query. Further, collaborative dataset consolidation system 110 may be configured to extend a dataset beyond its initial quantity and quality of data based on using atomized datasets that include atomized data points (e.g., as an addressable data unit or fact), which facilitates linking, joining, or merging the data from disparate data formats or data technologies (e.g., different schemas or applications for which a dataset is formatted). Atomized datasets facilitate data interoperability over disparate computing system platforms, architectures, and data storage devices, according to various embodiments.

According to some embodiments, collaborative dataset consolidation system 110 may be configured to provide a granular level of security with which an access to each dataset is determined on a dataset-by-dataset basis (e.g., per-user access or per-user account identifier to establish per-dataset authorization). Therefore, a user may be required to have per-dataset authorization to access a group of datasets less than a total number of datasets (including a single dataset). In some examples, dataset query engine 130 may be configured to assert query-level authorization or authentication. As such, non-users (e.g., participants) without account identifiers (or users without authentication) may apply a query (e.g., limited to a query, for example) to repository 140 without receiving authorization to access system 110 generally. Dataset query engine 130 may implement such a query so long as the query includes, or is otherwise associated with, authorization data.

Collaboration manager 160 may be configured as, or to implement, a collaborative data layer and associated logic to implement collaborative datasets for facilitating collaboration among consumers of datasets. For example, collaboration manager 160 may be configured to establish one or more associations (e.g., as metadata) among dataset attribute data (for a dataset) and/or other attribute data (for other datasets (e.g., within or without system 110)). As such, collaboration manager 160 can determine a correlation between data of one dataset to a subset of other datasets. In some cases, collaboration manager 160 may identify and promote a newly-discovered correlation to users associated with a subset of other databases. Or, collaboration manager 160 may disseminate information about activities (e.g., name of a user performing a query, types of data operations performed on a dataset, modifications to a dataset, etc.) for a particular dataset. To illustrate, consider that user 108a is situated in South America and is querying a recently-generated dataset that includes data about the Zika virus over different age ranges and genders over various population ranges. Further, consider that user 108b is situated in North America and also has generated or curated datasets directed to the Zika virus. Collaborative dataset consolidation system 110 may be configured to determine a correlation between the datasets of users 108a and 108b (i.e., subsets of data may be classified or annotated as Zika-related). System 110 also may optionally determine whether user 108b has interacted with the newly-generated dataset about the Zika virus (whether user, for example, viewed, queried, searched, etc. the dataset). Regardless, collaboration manager 160 may generate a notification to present in a user interface 118 of computing device 109b. As shown, user 108b is informed in an "activity feed" portion 116 of user interface 118 that "Dataset X" has been queried and is recommended to user 108b (e.g., based on the correlated scientific and research interests related to the Zika virus). User 108b, in turn, may modify Dataset X to form Dataset XX, thereby enabling a community of researchers to expeditiously access datasets (e.g., previously-unknown or newly-formed datasets) as they are generated to facilitate scientific collaborations, such as developing a vaccine for the Zika virus. Note that users 101a, 101b, and 101n may also receive similar notifications or information, at least some of which present one or more opportunities to collaborate and use, modify, and share datasets in a "viral" fashion. Therefore, collaboration manager 160 and/or other portions of collaborative dataset consolidation system 110 may provide collaborative data and logic layers to implement a "social network" for datasets.

Figure 2:
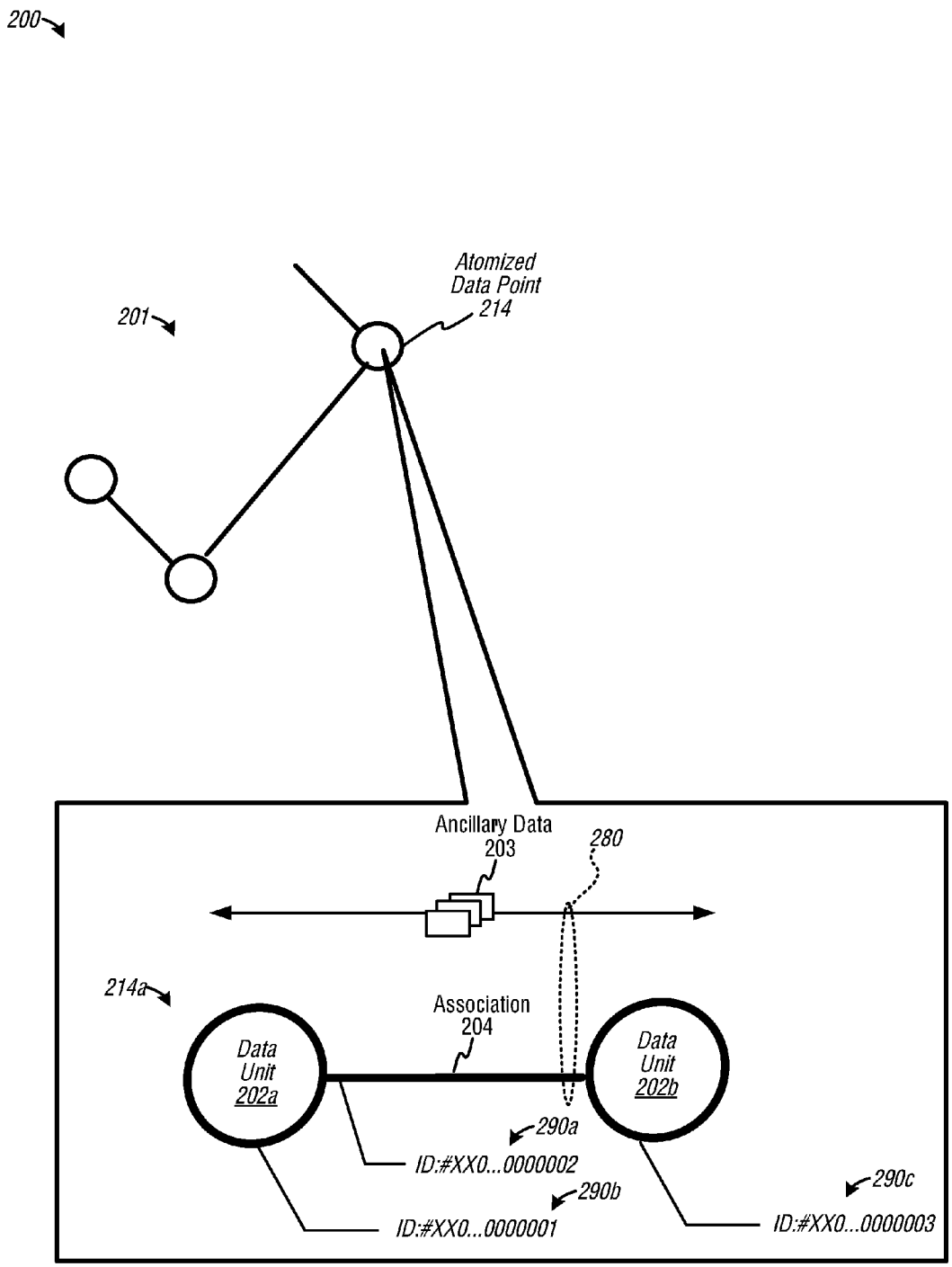
FIG. 2 is a diagram depicting an example of an atomized data point, according to some embodiments.

FIG. 2 is a diagram depicting an example of an atomized data point, according to some embodiments. Diagram 200 depicts a portion 201 of an atomized dataset that includes an atomized data point 214. In some examples, the atomized dataset is formed by converting a data format into a format associated with the atomized dataset. In some cases, portion 201 of the atomized dataset can describe a portion of a graph that includes one or more subsets of linked data. Further to diagram 200, one example of atomized data point 214 is shown as a data representation 214a, which may be represented by data representing two data units 202a and 202b (e.g., objects) that may be associated via data representing an association 204 with each other. One or more elements of data representation 214a may be configured to be individually and uniquely identifiable (e.g., addressable), either locally or globally in a namespace of any size. For example, elements of data representation 214a may be identified by identifier data 290a, 290b, and 290c.

In some embodiments, atomized data point 214a may be associated with ancillary data 203 to implement one or more ancillary data functions. For example, consider that association 204 spans over a boundary between an internal dataset, which may include data unit 202a, and an external dataset (e.g., external to a collaboration dataset consolidation), which may include data unit 202b. Ancillary data 203 may interrelate via relationship 280 with one or more elements of atomized data point 214a such that when data operations regarding atomized data point 214a are implemented, ancillary data 203 may be contemporaneously (or substantially contemporaneously) accessed to influence or control a data operation. In one example, a data operation may be a query and ancillary data 203 may include data representing authorization (e.g., credential data) to access atomized data point 214a at a query-level data operation (e.g., at a query proxy during a query). Thus, atomized data point 214a can be accessed if credential data related to ancillary data 203 is valid (otherwise, a query with which authorization data is absent may be rejected or invalidated). According to some embodiments, credential data, which may or may not be encrypted, may be integrated into or otherwise embedded in one or more of identifier data 290a, 290b, and 290c. Ancillary data 203 may be disposed in other data portion of atomized data point 214a, or may be linked (e.g., via a pointer) to a data vault that may contain data representing access permissions or credentials.

Atomized data point 214a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 214a may be expressed in accordance with Turtle, RDF/XML, N-Triples, N3, or other like RDF-related formats. As such, data unit 202a, association 204, and data unit 202b may be referred to as a "subject," "predicate," and "object," respectively, in a "triple" data point. In some examples, one or more of identifier data 290a, 290b, and 290c may be implemented as, for example, a Uniform Resource Identifier ("URI"), the specification of which is maintained by the Internet Engineering Task Force ("IETF"). According to some examples, credential information (e.g., ancillary data 203) may be embedded in a link or a URI (or in a URL) for purposes of authorizing data access and other data processes. Therefore, an atomized data point 214 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Figure 3:
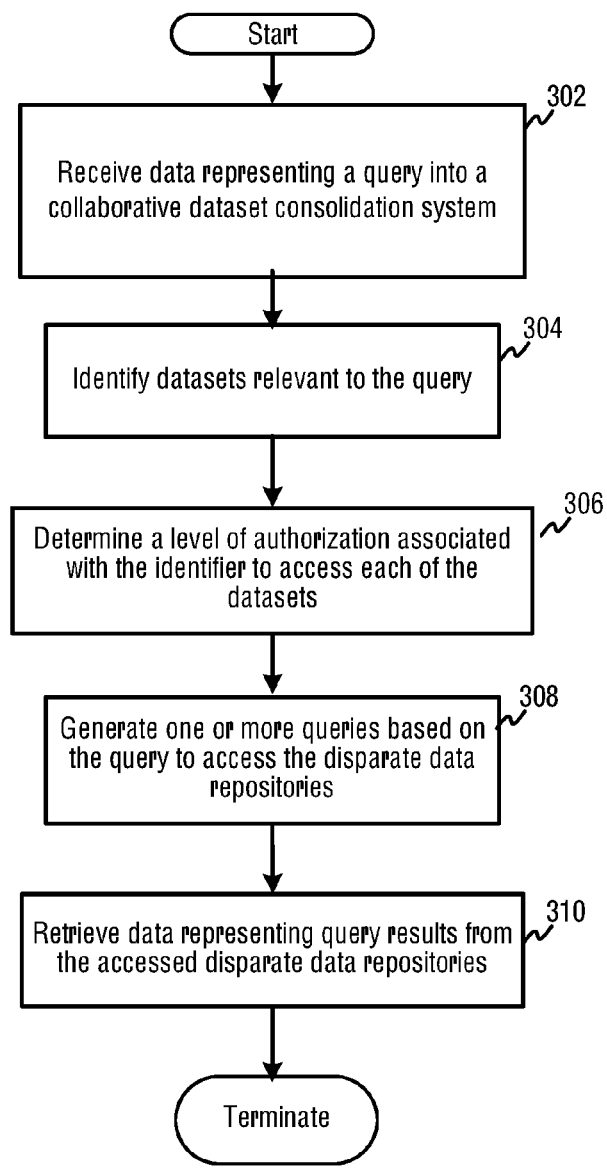
FIG. 3 is a diagram depicting an example of a flow chart to perform a query operation against collaborative datasets, according to some embodiments.

FIG. 3 is a diagram depicting an example of a flow chart to perform a query operation against collaborative datasets, according to some embodiments. Diagram 300 depicts a flow for an example of querying collaborative datasets in association with a collaborative dataset consolidation system. At 302, data representing a query may be received into a collaborative dataset consolidation system to query an atomized dataset. The atomized dataset may include subsets of linked atomized data points. In some examples, the dataset may be associated with or correlated to an identifier, such as a user account identifier or a dataset identifier. At 304, datasets relevant to the query are identified. The datasets may be disposed in disparate data repositories, regardless of whether internal to a system or external thereto. In some cases, a dataset relevant to a query may be identified by the user account identifier, the dataset identifier, or any other data (e.g., metadata or attribute data) that may describe data types and data classifications of the data in the datasets.

In some cases, at 304, a subset of data attributes associated with the query may be determined, such as a description or annotation of the data the subset of data attributes. To illustrate, consider an example in which the subset of data attributes includes data types or classifications that may be found as column in a tabular data format (e.g., prior to atomization or as an alternate view). The collaborative dataset consolidation system may then retrieve a subset of atomized datasets that include data equivalent to (or associated with) one or more of the data attributes. So if the subset of data attributes includes alphanumeric characters (e.g., two-letter codes, such as "AF" for Afghanistan), then the column can be identified as including country code data. Based on the country codes as a "data classification," the collaborative dataset consolidation system may correlate country code data in other atomized datasets to the dataset (e.g., the queried dataset). Then, the system may retrieve additional atomized datasets that include country codes to form a consolidated dataset. Thus, these datasets may be linked together by country codes. Note that in some cases, the system may implement logic to "infer" that two letters in a "column of data" of a tabular, pre-atomized dataset includes country codes. As such, the system may "derive" an annotation (e.g., a data type or classification) as a "country code." A dataset ingestion controller may be configured to analyze data and/or data attributes to correlate the same over multiple datasets, the dataset ingestion controller being further configured to infer a data type or classification of a grouping of data (e.g., data disposed in a column or any other data arrangement), according to some embodiments.

At 306, a level of authorization associated with the identifier may be identified to facilitate access to one or more of the datasets for the query. At, 308, one or more queries may be generated based on a query that may be configured to access the disparate data repositories. At least one of the one or more queries may be formed (e.g., rewritten) as a sub-query. That is, a sub-query may be generated to access a particular data type stored in a particular database engine or data store, either of which may be architected to accommodate a particular data type (e.g., data relating to time-series data, GPU-related processing data, geo-spatial-related data, etc.). At 310, data representing query results from the disparate data repositories may be retrieved. Note that a data repository from which a portion of the query results are retrieved may be disposed external to a collaborative dataset consolidation system. Further, data representing attributes or characteristics of the query may be passed to collaboration manager, which, in turn, may inform interested users of activities related to the dataset.

Figure 4:
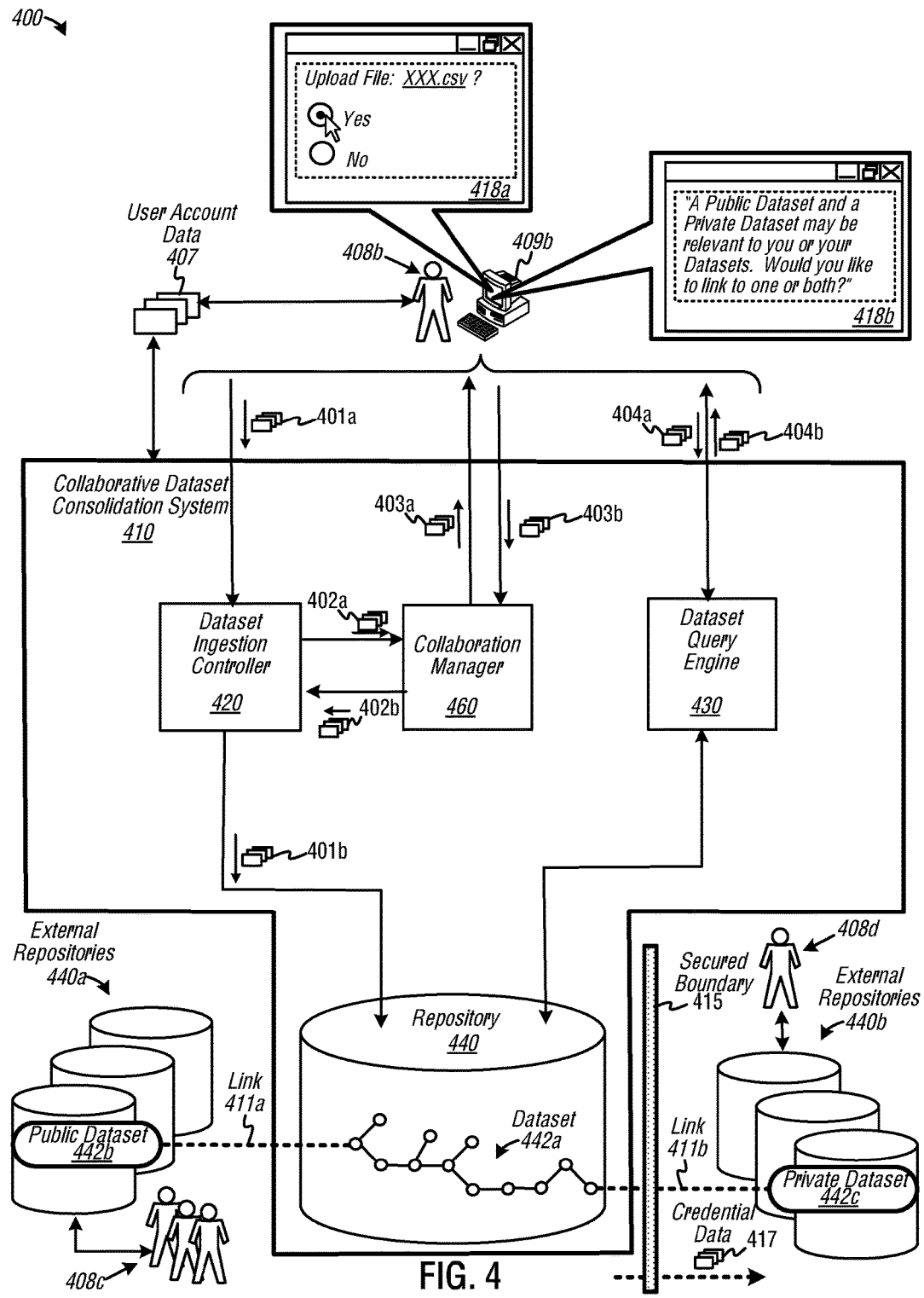
FIG. 4 is a diagram depicting operation an example of a collaborative dataset consolidation system, according to some examples.

FIG. 4 is a diagram depicting operation an example of a collaborative dataset consolidation system, according to some examples. Diagram 400 includes a collaborative dataset consolidation system 410, which, in turn, includes a dataset ingestion controller 420, a collaboration manager 460, a dataset query engine 430, and a repository 440, which may represent one or more data stores. In the example shown, consider that a user 408b, which is associated with a user account data 407, may be authorized to access (via networked computing device 409b) collaborative dataset consolidation system to create a dataset and to perform a query. User interface 418a of computing device 409b may receive a user input signal to activate the ingestion of a data file, such as a CSV formatted file (e.g., "XXX.csv"). Hence, dataset ingestion controller 420 may receive data 401a representing the CSV file and may analyze the data to determine dataset attributes. Examples of dataset attributes include annotations, data classifications, data types, a number of data points, a number of columns, a "shape" or distribution of data and/or data values, a normative rating (e.g., a number between 1 to 10 (e.g., as provided by other users)) indicative of the "applicability" or "quality" of the dataset, a number of queries associated with a dataset, a number of dataset versions, identities of users (or associated user identifiers) that analyzed a dataset, a number of user comments related to a dataset, etc.). Dataset ingestion controller 420 may also convert the format of data file 401a to an atomized data format to form data representing an atomized dataset 401b that may be stored as dataset 442a in repository 440.

As part of its processing, dataset ingestion controller 420 may determine that an unspecified column of data 401a, which includes five (5) integer digits, is a column of "zip code" data. As such, dataset ingestion controller 420 may be configured to derive a data classification or data type "zip code" with which each set of 5 digits can be annotated or associated. Further to the example, consider that dataset ingestion controller 420 may determine that, for example, based on dataset attributes associated with data 401a (e.g., zip code as an attribute), both a public dataset 442b in external repositories 440a and a private dataset 442c in external repositories 440b may be determined to be relevant to data file 401a. Individuals 408c, via a networked computing system, may own, maintain, administer, host or perform other activities in association with public dataset 442b. Individual 408d, via a networked computing system, may also own, maintain, administer, and/or host private dataset 442c, as well as restrict access through a secured boundary 415 to permit authorized usage.

Continuing with the example, public dataset 442b and private dataset 442c may include "zip code"-related data (i.e., data identified or annotated as zip codes). Dataset ingestion controller 420 generates a data message 402a that includes an indication that public dataset 442b and/or private dataset 442c may be relevant to the pending uploaded data file 401a (e.g., datasets 442b and 442c include zip codes). Collaboration manager 460 receive data message 402a, and, in turn, may generate user interface-related data 403a to cause presentation of a notification and user input data configured to accept user input at user interface 418b.

If user 408b wishes to "enrich" dataset 401a, user 408b may activate a user input (not shown on interface 418b) to generate a user input signal data 403b indicating a request to link to one or more other datasets. Collaboration manager 460 may receive user input signal data 403b, and, in turn, may generate instruction data 402*b* to generate an association (or link 441*a*) between atomized dataset 442*a* and public dataset 442*b* to form a consolidated dataset, thereby extending the dataset of user 408*b* to include knowledge embodied in external repositories 440*a*. Therefore, user 408*b*'s dataset may be generated as a collaborative dataset as it may be based on the collaboration with public dataset 442*b*, and, to some degree, its creators, individuals 408*c*. Note that while public dataset 442*b* may be shown external to system 410, public dataset 442*b* may be ingested via dataset ingestion controller 420 for storage as another atomized dataset in repository 440. Or, public dataset 442*b* may be imported into system 410 as an atomized dataset in repository 440 (e.g., link 411*a* is disposed within system 410). Similarly, if user 408*b* wishes to "enrich" atomized dataset 401*b* with private dataset 442*c*, user 408*b* may extend its dataset 442*a* by forming a link 411*b* to private dataset 442*c* to form a collaborative dataset. In particular, dataset 442*a* and private dataset 442*c* may consolidate to form a collaborative dataset (e.g., dataset 442*a* and private dataset 442*c* are linked to facilitate collaboration between users 408*b* and 408*d*). Note that access to private dataset 442*c* may require credential data 417 to permit authorization to pass through secured boundary 415. Note, too, that while private dataset 442*c* may be shown external to system 410, private dataset 442*c* may be ingested via dataset ingestion controller 420 for storage as another atomized dataset in repository 440. Or, private dataset 442*c* may be imported into system 410 as an atomized dataset in repository 440 (e.g., link 411*b* is disposed within system 410). According to some examples, credential data 417 may be required even if private dataset 442*c* is stored in repository 440. Therefore, user 408*d* may maintain dominion (e.g., ownership and control of access rights or privileges, etc.) of an atomized version of private dataset 442*c* when stored in repository 440.

Should user 408*b* desire not to link dataset 442*a* with other datasets, then upon receiving user input signal data 403*b* indicating the same, dataset ingestion controller 420 may store dataset 401*b* as atomized dataset 442*a* without links (or without active links) to public dataset 442*b* or private dataset 442*c*. Thereafter, user 408*b* may issue via computing device 409*b* query data 404*a* to dataset query engine 430, which may be configured to apply one or more queries to dataset 442*a* to receive query results 404*b*. Note that dataset ingestion controller 420 need not be limited to performing the above-described function during creation of a dataset. Rather, dataset ingestion controller 420 may continually (or substantially continuously) identify whether any relevant dataset is added or changed (beyond the creation of dataset 442*a*), and initiate a messaging service (e.g., via an activity feed) to notify user 408*b* of such events. According to some examples, atomized dataset 442*a* may be formed as triples compliant with an RDF specification, and repository 440 may be a database storage device formed as a "triplestore." While dataset 442*a*, public dataset 442*b*, and private dataset 442*c* are described above as separately partition graphs that may be linked to form consolidated datasets and graphs (e.g., at query time, or during any other data operation), dataset 442*a* may be integrated with either public dataset 442*b* or private dataset 442*c*, or both, to form a physically contiguous data arrangement or graph (e.g., a unitary graph without links), according to at least one example.

Figure 5:
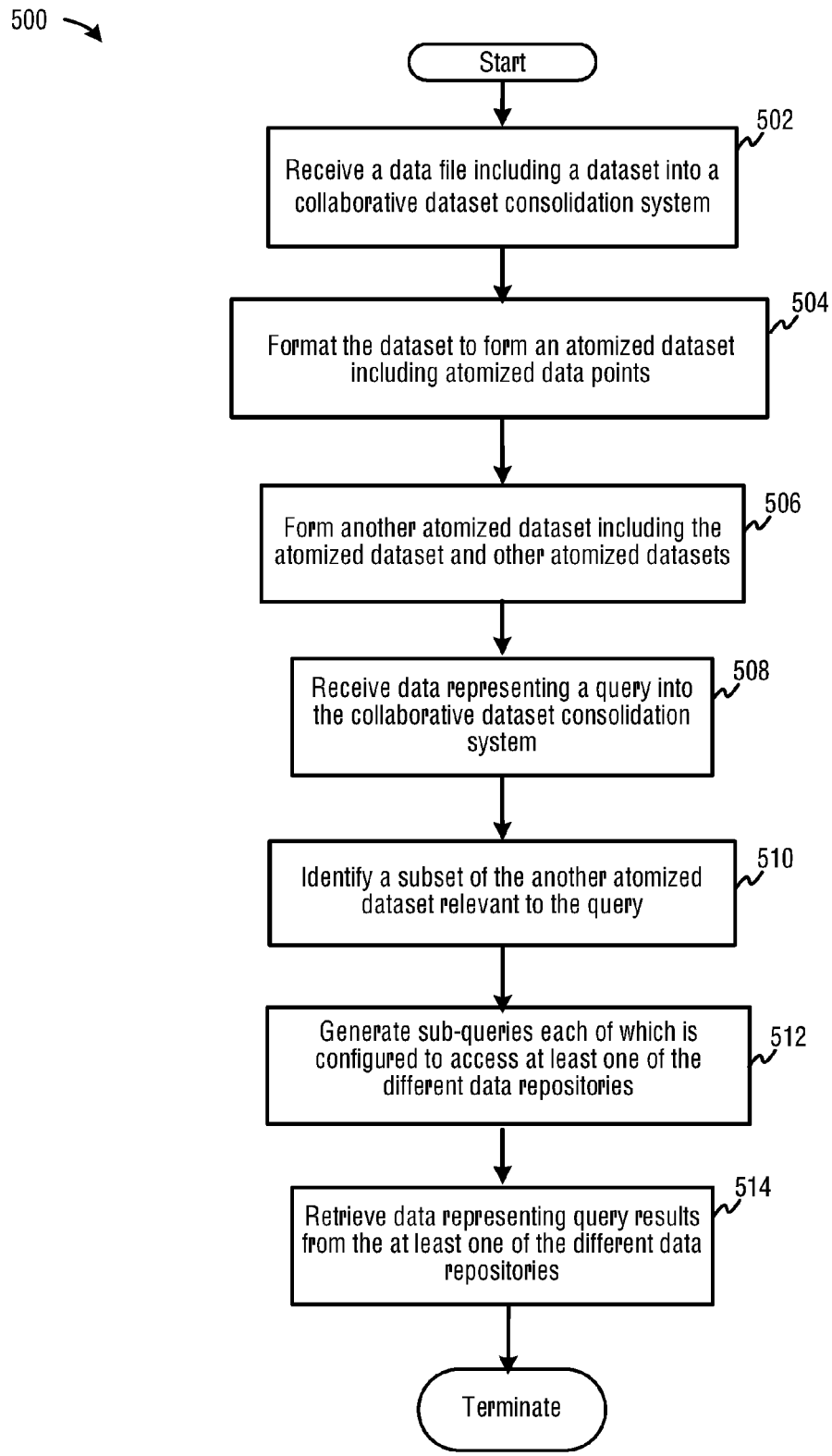
FIG. 5 is a diagram depicting a flow chart to perform an operation of a collaborative dataset consolidation system, according to some embodiments.

FIG. 5 is a diagram depicting a flow chart to perform an operation of a collaborative dataset consolidation system, according to some embodiments. Diagram 500 depicts a flow for an example of forming and querying collaborative datasets in association with a collaborative dataset consolidation system. At 502, a data file including a dataset may be received into a collaborative dataset consolidation system, and the dataset may be formatted at 504 to form an atomized dataset (e.g., a first atomized dataset). The atomized dataset may include atomized data points, whereby each atomized data point may include data representing at least two objects (e.g., a subject and an object of a "triple") and an association (e.g., a predicate) between the two objects. At 506, another atomized dataset (e.g., a second atomized dataset) may be formed to include the first atomized dataset and one or more other atomized datasets. For example, a consolidated dataset, as a second atomized dataset, may include the atomized dataset linked to other atomized datasets. In some cases, other datasets, such as differently-formatted datasets may be converted to a similar format so that the datasets may interoperate with each other as well as the data set of 504. Thus, an atomized dataset may be formed (e.g., as a consolidated dataset) by linking one or more atomized datasets to the dataset of 504. According to some embodiments, 506 and related functionalities may be optional. At 508, data representing a query may be received into the collaborative dataset consolidation system. The query may be associated with an identifier, which may be an attribute of a user, a dataset, or any other component or element associated with a collaborative dataset consolidated system. At 510, a subset of another atomized dataset relevant to the query may be identified. Here, some portions of the other dataset may be disposed in different data repositories. For example, one or more portions of a second atomized dataset may be identified as being relevant to a query or sub-query. Multiple relevant portions of the second atomized dataset may reside or may be stored in different databases or data stores. At 512, sub-queries may be generated such that each may be configured to access at least one of the different data repositories. For example a first sub-query may be applied (e.g., re-written) to access a first type of triplestore (e.g., a triplestore architected to function as a BLAZEGRAPH triplestore, which is developed by Systap, LLC of Washington, D.C., U.S.A.), a second sub-query may be configured to access a second type of triple store (e.g., a triplestore architected to function as a STARDOG triplestore, which is developed by Complexible, Inc. of Washington, D.C., U.S.A.), and a third sub-query may be applied to access a first type of triplestore (e.g., a triplestore architected to function as a FUSEKI triplestore, which may be maintained by The Apache Software Foundation of Forest Hill, Md., U.S.A.). At 514, data representing query results from at least one of the different data repositories may be received. According to various embodiments, the query may be re-written and applied to data stores serially (or substantially serially) or in parallel (or substantially in parallel), or in any combination thereof.

Figure 6:
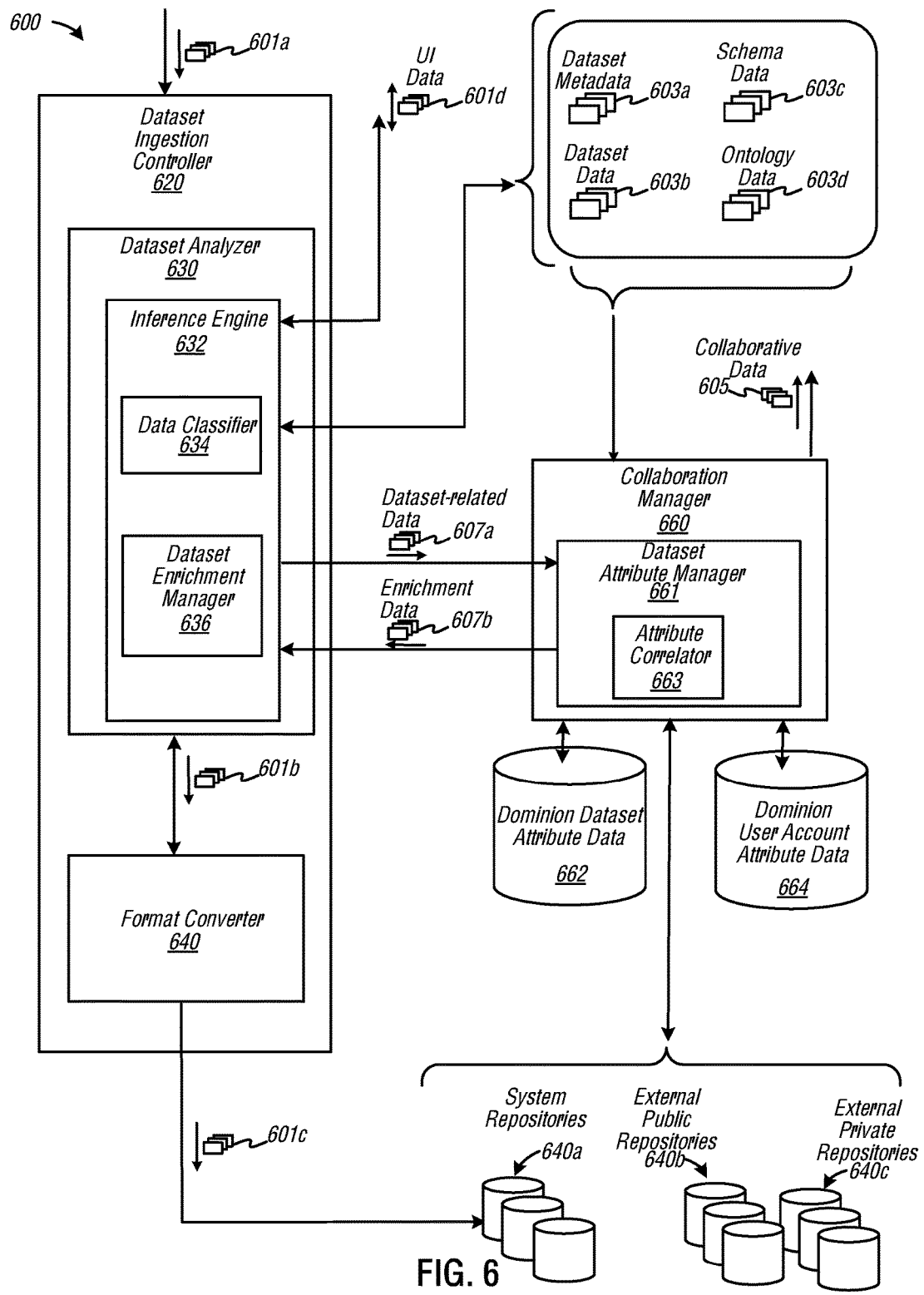
FIG. 6 is a diagram depicting an example of a dataset analyzer and an inference engine, according to some embodiments.

FIG. 6 is a diagram depicting an example of a dataset analyzer and an inference engine, according to some embodiments. Diagram 600 includes a dataset ingestion controller 620, which, in turn, includes a dataset analyzer 630 and a format converter 640. As shown, dataset ingestion controller 620 may be configured to receive data file 601*a*, which may include a dataset formatted in a specific format. An example of a format includes CSV, JSON, XML, XLS, XLS, MySQL, binary, RDF, or other similar data formats. Dataset analyzer 630 may be configured to analyze data file 601*a* to detect and resolve data entry exceptions (e.g., an image embedded in a cell of a tabular file, missing annotations, etc.). Dataset analyzer 630 also may be configured to classify subsets of data (e.g., a column) in data file 601a as a particular data type (e.g., integers representing a year expressed in accordance with a Gregorian calendar schema, five digits constitute a zip code, etc.), and the like. Dataset analyzer 630 can be configured to analyze data file 601a to note the exceptions in the processing pipeline, and to append, embed, associate, or link user interface features to one or more elements of data file 601a to facilitate collaborative user interface functionality (e.g., at a presentation layer) with respect to a user interface. Further, dataset analyzer 630 may be configured to analyze data file 601a relative to dataset-related data to determine correlations among dataset attributes of data file 601a and other datasets 603b (and attributes, such as metadata 603a). Once a subset of correlations has been determined, a dataset formatted in data file 601a (e.g., as an annotated tabular data file, or as a CSV file) may be enriched, for example, by associating links to the dataset of data file 601a to form the dataset of data file 601b, which, in some cases, may have a similar data format as data file 601a (e.g., with data enhancements, corrections, and/or enrichments). Note that while format converter 640 may be configured to convert any CSV, JSON, XML, XLS, RDF, etc. into RDF-related data formats, format converter 640 may also be configured to convert RDF and non-RDF data formats into any of CSV, JSON, XML, XLS, MySQL, binary, XLS, RDF, etc. Note that the operations of dataset analyzer 630 and format converter 640 may be configured to operate in any order serially as well as in parallel (or substantially in parallel). For example, dataset analyzer 630 may analyze datasets to classify portions thereof, either prior to format conversion by formatter converter 640 or subsequent to the format conversion. In some cases, at least one portion of format conversion may occur during dataset analysis performed by dataset analyzer 630.

Format converter 640 may be configured to convert dataset of data file 601b into an atomized dataset 601c, which, in turn, may be stored in system repositories 640a that may include one or more atomized data store (e.g., including at least one triplestore). Examples of functionalities to perform such conversions may include, but are not limited to, CSV2RDF data applications to convert CVS datasets to RDF datasets (e.g., as developed by Rensselaer Polytechnic Institute and referenced by the World Wide Web Consortium ("W3C")), R2RML data applications (e.g., to perform RDB to RDF conversion, as maintained by the World Wide Web Consortium ("W3C")), and the like.

As shown, dataset analyzer 630 may include an inference engine 632, which, in turn, may include a data classifier 634 and a dataset enrichment manager 636. Inference engine 632 may be configured to analyze data in data file 601a to identify tentative anomalies and to infer corrective actions, or to identify tentative data enrichments (e.g., by joining with other datasets) to extend the data beyond that which is in data file 601a. Inference engine 632 may receive data from a variety of sources to facilitate operation of inference engine 632 in inferring or interpreting a dataset attribute (e.g., as a derived attribute) based on the analyzed data. Responsive to a request input data via data signal 601d, for example, a user may enter a correct annotation into a user interface, which may transmit corrective data 601d as, for example, an annotation or column heading. Thus, the user may correct or otherwise provide for enhanced accuracy in atomized dataset generation "in-situ," or during the dataset ingestion and/or graph formation processes. As another example, data from a number of sources may include dataset metadata 603 (e.g., descriptive data or information specifying dataset attributes), dataset data 603b (e.g., some or all data stored in system repositories 640a, which may store graph data), schema data 603c (e.g., sources, such as schema.org, that may provide various types and vocabularies), ontology data 603d from any suitable ontology (e.g., data compliant with Web Ontology Language ("OWL"), as maintained by the World Wide Web Consortium ("W3C")), and any other suitable types of data sources.

In one example, data classifier 634 may be configured to analyze a column of data to infer a datatype of the data in the column. For instance, data classifier 634 may analyze the column data to infer that the columns include one of the following datatypes: an integer, a string, a time, etc., based on, for example, data from data 601d, as well as based on data from data 603a to 603d. In another example, data classifier 634 may be configured to analyze a column of data to infer a data classification of the data in the column (e.g., where inferring the data classification may be more sophisticated than identifying or inferring a datatype). For example, consider that a column of ten (10) integer digits is associated with an unspecified or unidentified heading. Data classifier 634 may be configured to deduce the data classification by comparing the data to data from data 601d, and from data 603a to 603d. Thus, the column of unknown 10-digit data in data 601a may be compared to 10-digit columns in other datasets that are associated with an annotation of "phone number." Thus, data classifier 634 may deduce the unknown 10-digit data in data 601a includes phone number data.

In yet another example, inference engine 632 may receive data (e.g., datatype or data classification, or both) from an attribute correlator 663. As shown, attribute correlator 663 may be configured to receive data, including attribute data, from dataset ingestion controller 620, from data sources (e.g., UI-related/user inputted data 601d, and data 603a to 603d), from system repositories 640a, from external public repository 640b, from external private repository 640c, from dominion dataset attribute data store 662, from dominion user account attribute data store 662, and from any other sources of data. In the example shown, dominion dataset attribute data store 662 may be configured to store dataset attribute data for most, a predominant amount, or all of data over which collaborative dataset consolidation system has dominion, whereas dominion user account attribute data store 662 may be configured to store user or user account attribute data for most, a predominant amount, or all of the data in its domain.

Attribute correlator 663 may be configured to analyze the data to detect patterns that may resolve an issue. For example, attribute correlator 663 may be configured to analyze the data, including datasets, to "learn" whether unknown 10-digit data is likely a "phone number" rather than another data classification. In this case, a probability may be determined that a phone number is a more reasonable conclusion based on, for example, regression analysis or similar analyses. Further, attribute correlator 663 may be configured to detect patterns or classifications among datasets and other data through the use of Bayesian networks, clustering analysis, as well as other known machine learning techniques or deep-learning techniques. Attribute correlator 663 also may be configured to generate enrichment data 607b that may include probabilistic or predictive data specifying, for example, a data classification or a link to other datasets to enrich a dataset. According to some examples, attribute correlator 663 may further be configured to analyze data in dataset 601a, and based on that analysis, attribute correlator 663 may be configured to recommend or implement one or more added columns of data. To illustrate, consider that attribute correlator 663 may be configured to derive a specific correlation based on data 607a that describe three (3) columns, whereby those three columns are sufficient to add a fourth ($4^{th}$) column as a derived column. In some cases, the data in the $4^{th}$ column may be derived mathematically via one or more formulae. Therefore, additional data may be used to form, for example, additional "triples" to enrich or augment the initial dataset.

In yet another example, inference engine 632 may receive data (e.g., enrichment data 607b) from a dataset attribute manager 661, where enrichment data 607b may include derived data or link-related data to form consolidated datasets. Consider that attribute correlator 663 can detect patterns in datasets in repositories 640a to 640c, among other sources of data, whereby the patterns identify or correlate to a subset of relevant datasets that may be linked with the dataset in data 601a. The linked datasets may form a consolidated dataset that is enriched with supplemental information from other datasets. In this case, attribute correlator 663 may pass the subset of relevant datasets as enrichment data 607b to dataset enrichment manager 636, which, in turn, may be configured to establish the links for a dataset in 601b. A subset of relevant datasets may be identified as a supplemental subset of supplemental enrichment data 607b. Thus, converted dataset 601c (i.e., an atomized dataset) may include links to establish collaborative dataset formed with consolidated datasets.

Dataset attribute manager 661 may be configured to receive correlated attributes derived from attribute correlator 663. In some cases, correlated attributes may relate to correlated dataset attributes based on data in data store 662 or based on data in data store 664, among others. Dataset attribute manager 661 also monitors changes in dataset and user account attributes in respective repositories 662 and 664. When a particular change or update occurs, collaboration manager 660 may be configured to transmit collaborative data 605 to user interfaces of subsets of users that may be associated the attribute change (e.g., users sharing a dataset may receive notification data that the dataset has been updated or queried).

Therefore, dataset enrichment manager 636, according to some examples, may be configured identify correlated datasets based on correlated attributes as determined, for example, by attribute correlator 663. The correlated attributes, as generated by attribute correlator 663, may facilitate the use of derived data or link-related data, as attributes, to form associate, combine, join, or merge datasets to form consolidated datasets. A dataset 601b may be generated by enriching a dataset 601a using dataset attributes to link to other datasets. For example, dataset 601a may be enriched with data extracted from (or linked to) other datasets identified by (or sharing similar) dataset attributes, such as data representing a user account identifier, user characteristics, similarities to other datasets, one or more other user account identifiers that may be associated with a dataset, data-related activities associated with a dataset (e.g., identity of a user account identifier associated with creating, modifying, querying, etc. a particular dataset), as well as other attributes, such as a "usage" or type of usage associated with a dataset. For instance, a virus-related dataset (e.g., Zika dataset) may have an attribute describing a context or usage of dataset, such as a usage to characterize susceptible victims, usage to identify a vaccine, usage to determine an evolutionary history of a virus, etc. So, attribute correlator 663 may be configured to correlate datasets via attributes to enrich a particular dataset.

According to some embodiments, one or more users or administrators of a collaborative dataset consolidation system may facilitate curation of datasets, as well as assisting in classifying and tagging data with relevant datasets attributes to increase the value of the interconnected dominion of collaborative datasets. According to various embodiments, attribute correlator 663 or any other computing device operating to perform statistical analysis or machine learning may be configured to facilitate curation of datasets, as well as assisting in classifying and tagging data with relevant datasets attributes. In some cases, dataset ingestion controller 620 may be configured to implement third-party connectors to, for example, provide connections through which third-party analytic software and platforms (e.g., R, SAS, Mathematica, etc.) may operate upon an atomized dataset in the dominion of collaborative datasets.

Figure 7:
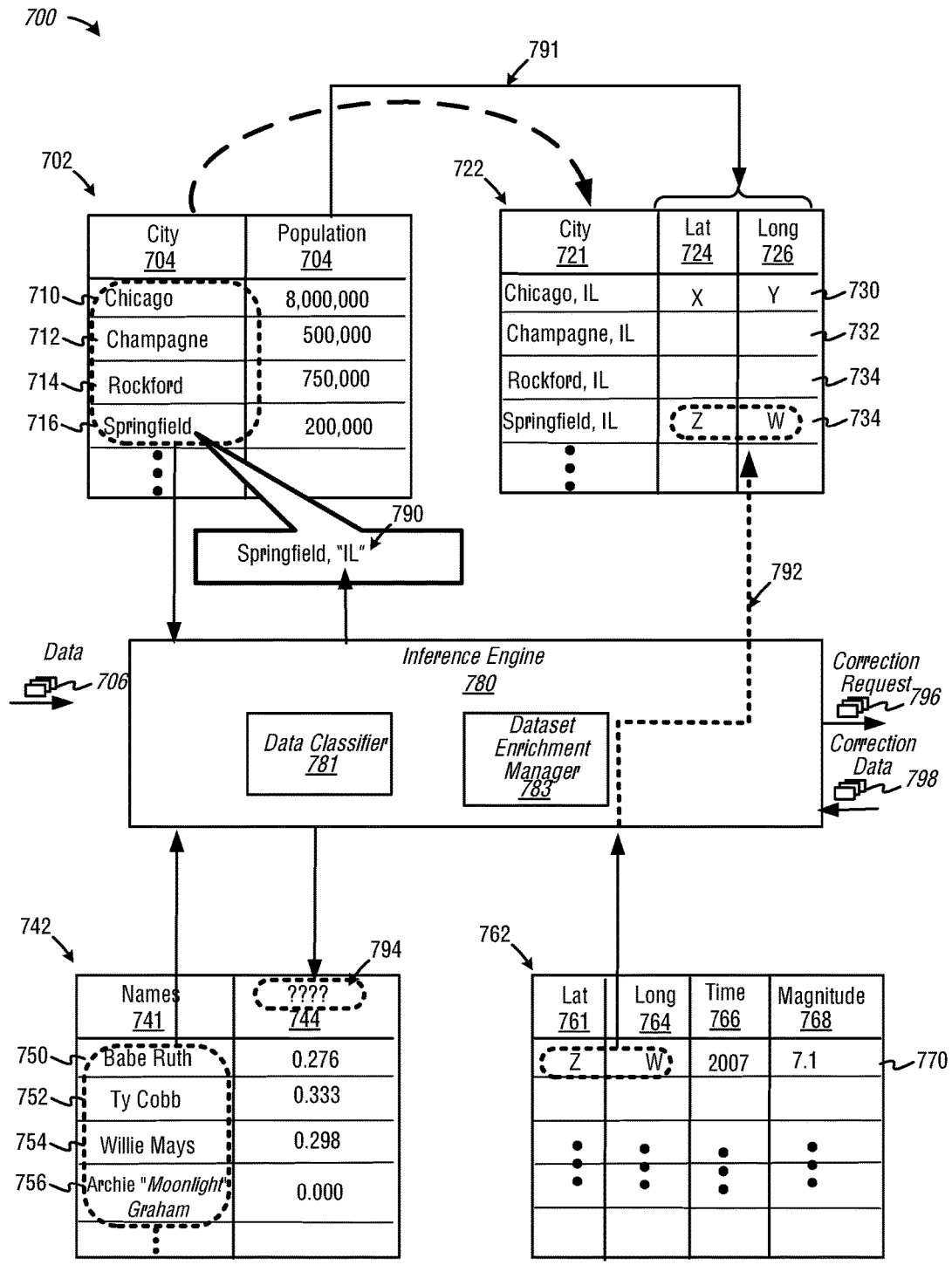
FIG. 7 is a diagram depicting operation of an example of an inference engine, according to some embodiments.

FIG. 7 is a diagram depicting operation of an example of an inference engine, according to some embodiments. Diagram 700 depicts an inference engine 780 including a data classifier 781 and a dataset enrichment manager 783, whereby inference engine 780 is shown to operate on data 706 (e.g., one or more types of data described in FIG. 6), and further operates on annotated tabular data representations of dataset 702, dataset 722, dataset 742, and dataset 762. Dataset 702 includes rows 710 to 716 that relate each population number 704 to a city 702. Dataset 722 includes rows 730 to 736 that relate each city 721 to both a geo-location described with a latitude coordinate ("lat") 724 and a longitude coordinate ("long") 726. Dataset 742 includes rows 750 to 756 that relate each name 741 to a number 744, whereby column 744 omits an annotative description of the values within column 744. Dataset 762 includes rows, such as row 770, that relate a pair of geo-coordinates (e.g., latitude coordinate ("lat") 761 and a longitude coordinate ("long") 764) to a time 766 at which a magnitude 768 occurred during an earthquake.

Inference engine 780 may be configured to detect a pattern in the data of column 704 in dataset 702. For example, column 704 may be determined to relate to cities in Illinois based on the cities shown (or based on additional cities in column 704 that are not shown, such as Skokie, Cicero, etc.). Based on a determination by inference engine 780 that cities 704 likely are within Illinois, then row 716 may be annotated to include annotative portion ("IL") 790 (e.g., as derived supplemental data) so that Springfield in row 716 can be uniquely identified as "Springfield, Ill." rather than, for example, "Springfield, Nebr." or "Springfield, Mass." Further, inference engine 780 may correlate columns 704 and 721 of datasets 702 and 722, respectively. As such, each population number in rows 710 to 716 may be correlated to corresponding latitude 724 and longitude 726 coordinates in rows 730 to 734 of dataset 722. Thus, dataset 702 may be enriched by including latitude 724 and longitude 726 coordinates as a supplemental subset of data. In the event that dataset 762 (and latitude 724 and longitude 726 data) are formatted differently than dataset 702, then latitude 724 and longitude 726 data may be converted to an atomized data format (e.g., compatible with RDF). Thereafter, a supplemental atomized dataset can be formed by linking or integrating atomized latitude 724 and longitude 726 data with atomized population 704 data in an atomized version of dataset 702. Similarly, inference engine 780 may correlate columns 724 and 726 of dataset 722 to columns 761 and 764. As such, earthquake data in row 770 of dataset 762 may be correlated to the city in row 734 ("Springfield, Ill.") of dataset 722 (or correlated to the city in row 716 of dataset 702 via the linking between columns 704 and 721). The earthquake data may be derived via lat/long coordinate-to-earthquake correlations as supplemental data for dataset 702. Thus, new links (or triples) may be formed to supplement population data 704 with earthquake magnitude data 768.

Inference engine 780 also may be configured to detect a pattern in the data of column 741 in dataset 742. For example, inference engine 780 may identify data in rows 750 to 756 as "names" without an indication of the data classification for column 744. Inference engine 780 can analyze other datasets to determine or learn patterns associated with data, for example, in column 741. In this example, inference engine 780 may determine that names 741 relate to the names of "baseball players." Therefore, inference engine 780 determines (e.g., predicts or deduces) that numbers in column 744 may describe "batting averages." As such, a correction request 796 may be transmitted to a user interface to request corrective information or to confirm that column 744 does include batting averages. Correction data 798 may include an annotation (e.g., batting averages) to insert as annotation 794, or may include an acknowledgment to confirm "batting averages" in correction request data 796 is valid. Note that the functionality of inference engine 780 is not limited to the examples describe in FIG. 7 and is more expansive than as described in the number of examples.

Figure 8:
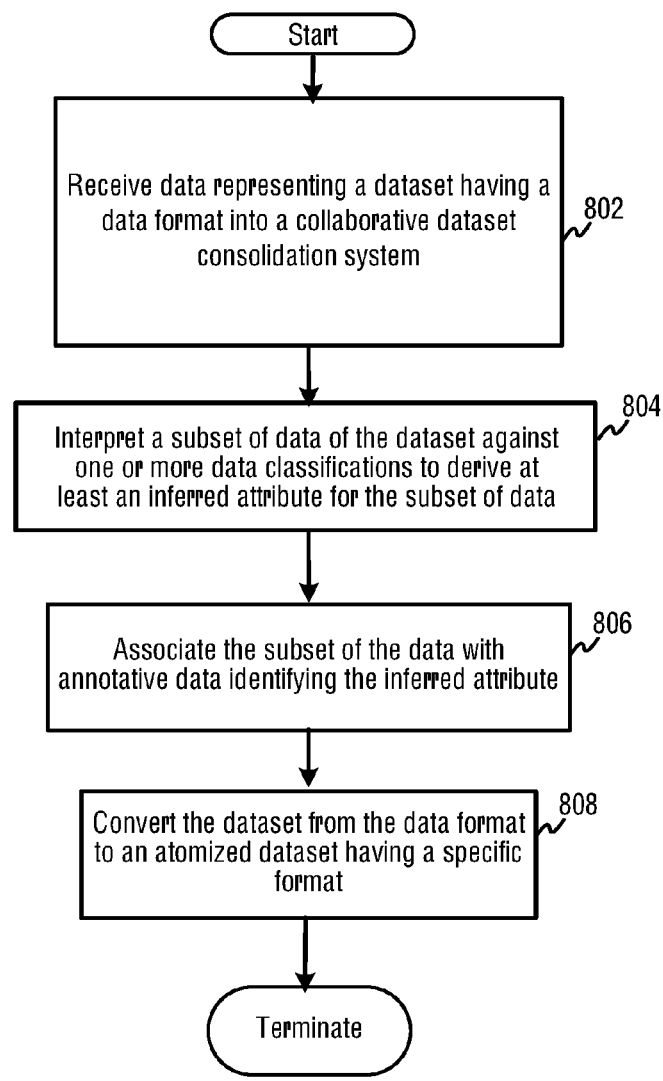
FIG. 8 is a diagram depicting a flow chart as an example of ingesting an enhanced dataset into a collaborative dataset consolidation system, according to some embodiments.

FIG. 8 is a diagram depicting a flow chart as an example of ingesting an enhanced dataset into a collaborative dataset consolidation system, according to some embodiments. Diagram 800 depicts a flow for an example of inferring dataset attributes and generating an atomized dataset in a collaborative dataset consolidation system. At 802, data representing a dataset having a data format may be received into a collaborative dataset consolidation system. The dataset may be associated with an identifier or other dataset attributes with which to correlate the dataset. At 804, a subset of data of the dataset is interpreted against subsets of data (e.g., columns of data) for one or more data classifications (e.g., datatypes) to infer or derive at least an inferred attribute for a subset of data (e.g., a column of data). In some examples, the subset of data may relate to a columnar representation of data in an annotated tabular data format, or CSV file. At 806, the subset of the data may be associated with annotative data identifying the inferred attribute. Examples of an inferred attribute include the inferred "baseball player" names annotation and the inferred "batting averages" annotation, as described in FIG. 7. At 808, the dataset is converted from the data format to an atomized dataset having a specific format, such as an RDF-related data format. The atomized dataset may include a set of atomized data points, whereby each data point may represented as a RDF triple. According to some embodiments, inferred dataset attributes may be used to identify subsets of data in other dataset, which may be used to extend or enrich a dataset. An enriched dataset may be stored as data representing "an enriched graph" in, for example, a triplestore or an RDF store (e.g., based on a graph-based RDF model). In other cases, enriched graphs formed in accordance with the above may be stored in any type of data store or with any database management system.

Figure 9:
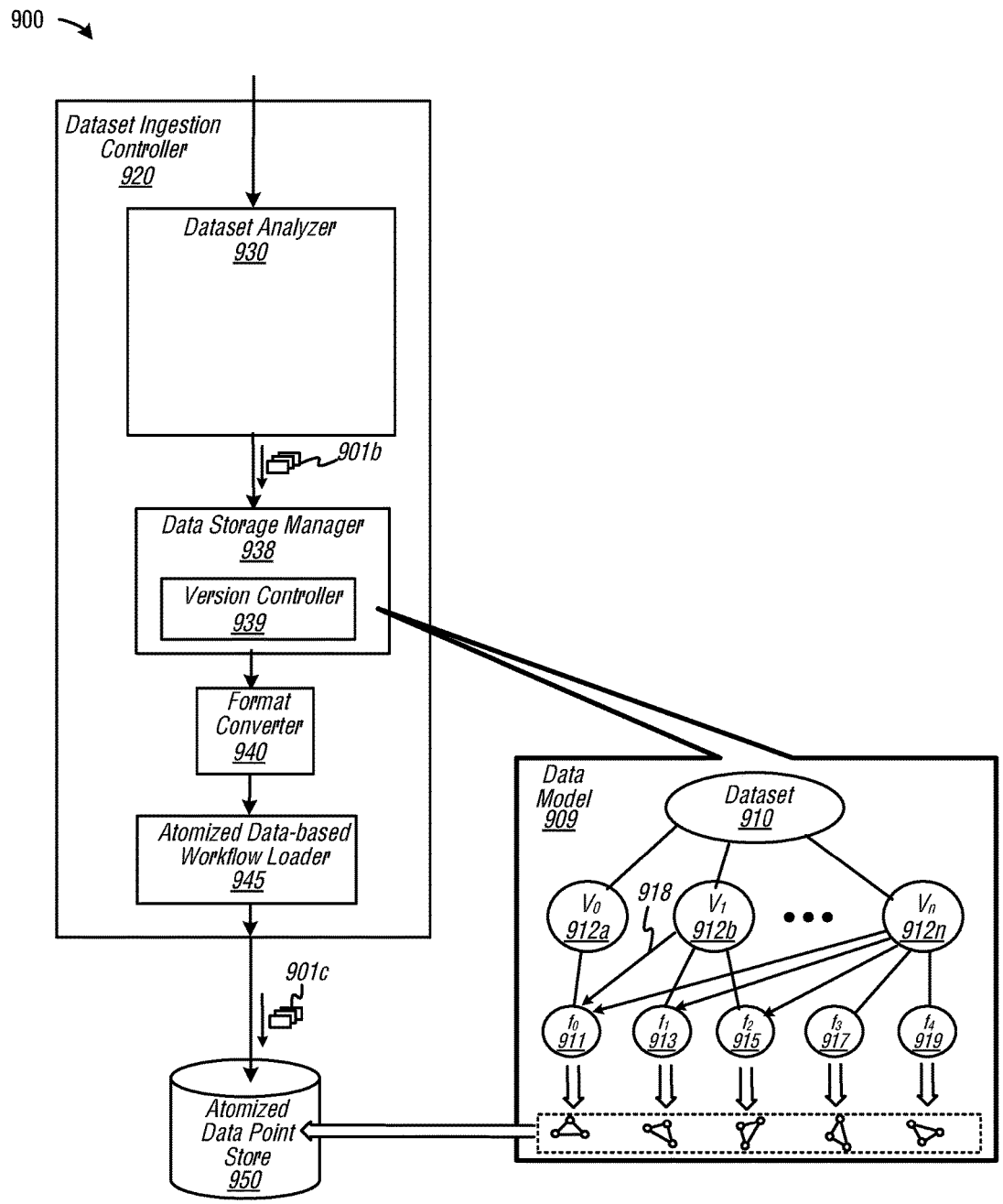
FIG. 9 is a diagram depicting an example of a dataset ingestion controller, according to various embodiments.

FIG. 9 is a diagram depicting another example of a dataset ingestion controller, according to various embodiments. Diagram 900 depicts a dataset ingestion controller 920 including a dataset analyzer 930, a data storage manager 938, a format converter 940, and an atomized data-based workflow loader 945. Further, dataset ingestion controller 920 is configured to load atomized data points in an atomized dataset 901*c* into an atomized data point store 950, which, in some examples, may be implemented as a triplestore. According to some examples, elements depicted in diagram 900 of FIG. 9 may include structures and/or functions as similarly-named or similarly-numbered elements depicted in other drawings.

Data storage manager 938 may be configured to build a corpus of collaborative datasets by, for example, forming "normalized" data files in a collaborative dataset consolidation system, such that a normalized data file may be represented as follows:

/hash/XXX,
  where "hash" may be a hashed representation as a filename (i.e., a reduced or compressed representation of the data), whereby a filename may be based on, for example, a hash value of the bites in the raw data, and
  where XXX indicates either "raw" (e.g., raw data), "treatment*" (e.g., a treatment file that specifies treatments applied to data, such as identifying each column, etc.) or "meta*" (e.g., an amount of metadata).

Further, data storage manager 938 may configure dataset versions to hold an original file name as a pointer to a storage location. In accordance with some examples, identical original files need be stored one time in atomized data point store 950. Data storage manager 938 may operate to normalize data files into a graph of triples, whereby each dataset version may be loaded into a graph database instance. Also, data storage manager 938 may be configured to maintain searchable endpoints for dataset 910 over one or more versions (e.g., simultaneously).

An example of a data model with which data storage manager 938 stores data is shown as data model 909. In this model, a dataset 910 may be treated as versions (V0) 912, (V1) 912*b* and (Vn) 912*n*, and versions may be treated as records or files (f0) 911, (f1) 913, (f2) 915, (f3) 917, and (f4) 919. Dataset 910 may include a directed graph of dataset versions and a set of named references to versions within the dataset. A dataset version 912 may contain a hierarchy of named files, each with a name unique within a version and a version identifier. The dataset version may reference a data file (e.g., 911 to 919). A data file record, or file, they referred to an "original" data file (e.g., the raw user-provided bytes), and any "treatments" to the file that are stored alongside original files these treatments can include, for example a converted file containing the same data represented as triples, or a schema or metadata about the file. In the example shown for data model 909, version 912*a* may include a copy of a file 911. A next version 912*b* is shown to include copies of files 913 and 915, as well as including a pointer 918 to file 911, whereas a subsequent version 912*n* is shown to include copies of files 917 and 919, as well as pointers 918 to files 911, 913, and 915.

Version controller 939 may be configured to manage the versioning of dataset 910 by tracking each version as an "immutable" collection of data files and pointers to data files. As the dataset versions are configured to be immutable, when dataset 910 is modified, version controller 939 provides for a next version, whereby new data (e.g., changed data) is stored in a file and pointers to previous files are identified.

Atomized data-based workflow loader 945, according to some examples, may be configured to load graph data onto atomized data point store 950 (e.g., a triplestore) from disk (e.g., an S3 Amazon® cloud storage server).

Figure 10:
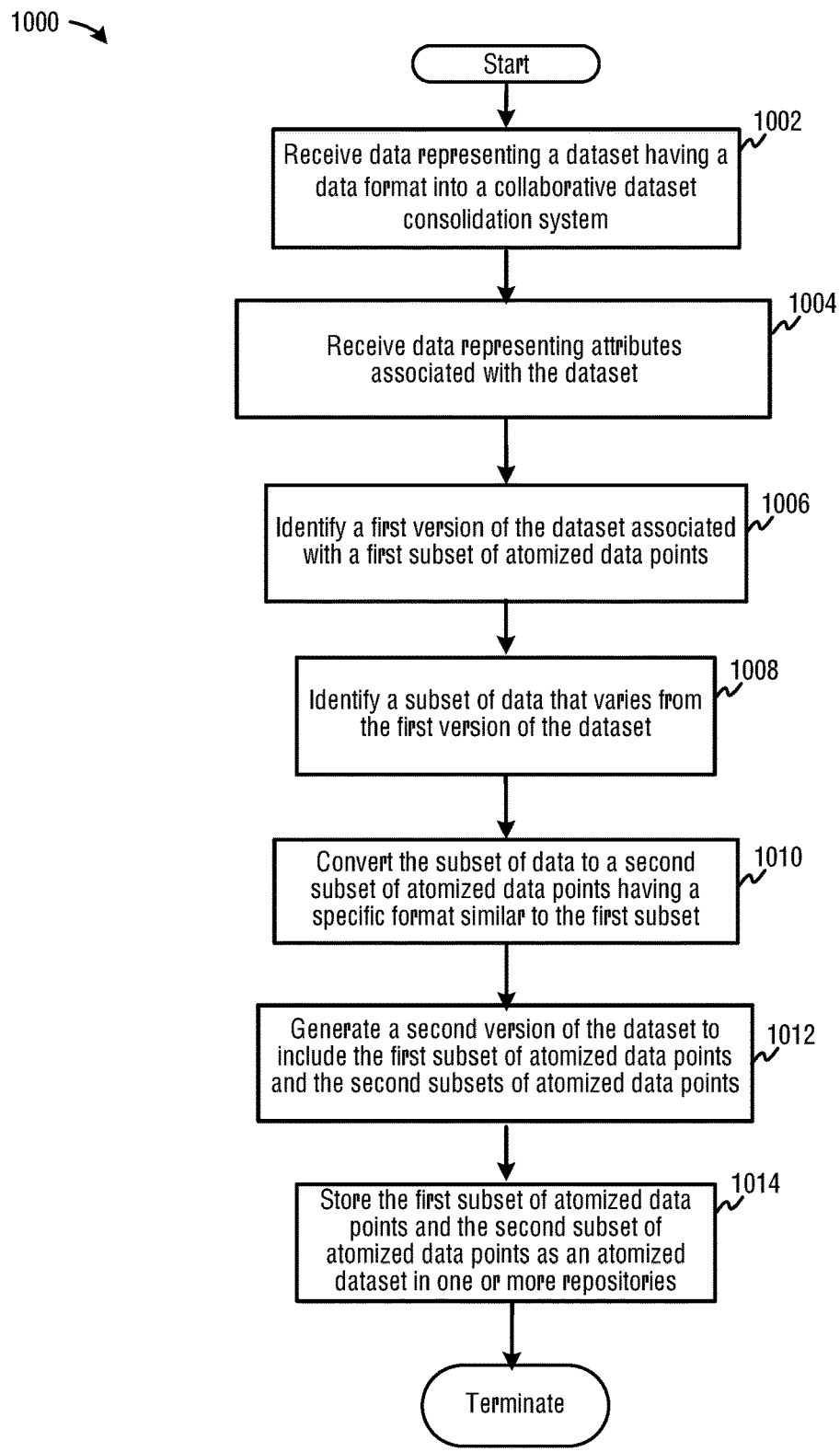
FIG. 10 is a diagram depicting a flow chart as an example of managing versioning of dataset, according to some embodiments.

FIG. 10 is a diagram depicting a flow chart as an example of managing versioning of dataset, according to some embodiments. Diagram 1000 depicts a flow for generating, for example, an immutable next version in a collaborative dataset consolidation system. At 1002, data representing a dataset (e.g., a first dataset) having a data format may be received into a collaborative dataset consolidation system. At 1004, data representing attributes associated with the dataset may also be received. The attributes may include an account identifier or other dataset or user account attributes. At 1006, a first version of the dataset associated with a first subset of atomized data points is identified. In some cases, the first subset of atomized data points may be stored in a graph or any other type of database (e.g., a triplestore). A subset of data that varies from the first version of the dataset is identified at 1008. In some examples, the subset of data that varies from the first version may be modified data of the first dataset, or the subset of data may be data from another dataset that is integrated or linked to the first dataset. In some cases, the subset of data that varies from the first version is being added or deleted from that version to form another version. At 1010, the subset of data may be converted to a second subset of atomized data points, which may have a specific format similar to the first subset. The subset of data may be another dataset that is converted into the specific format. For example, both may be in triples format.

At 1012, a second version of the dataset is generated to include the first subset of atomized data points and the second subsets of atomized data points. According to some examples, the first version and second version persist as immutable datasets that may be referenced at any or most times (e.g., a first version may be cited as being relied on in a query that contributes to published research results regardless of a second or subsequent version). Further, a second version need not include a copy of the first subset of atomized data points, but rather may store a pointer the first subset of atomized data points along with the second subsets of atomized data points. Therefore, subsequent version may be retained without commensurate increases in memory to store subsequent immutable versions, according to some embodiments. Note, too, that the second version may include the second subsets of atomized data points as a protected dataset that may be authorized for inclusion into the second version (i.e., a user creating the second version may need authorization to include the second subsets of atomized data points). At 1014, the first subset of atomized data points and the second subset of atomized data points as an atomized dataset are stored in one or more repositories. Therefore, multiple sources of data may provide differently-formatted datasets, whereby flow 1000 may be implemented to transform the formats of each dataset to facilitate interoperability among the transformed datasets. According to various examples, more or fewer of the functionalities set forth in flow 1000 may be omitted or maybe enhanced.

Figure 11:
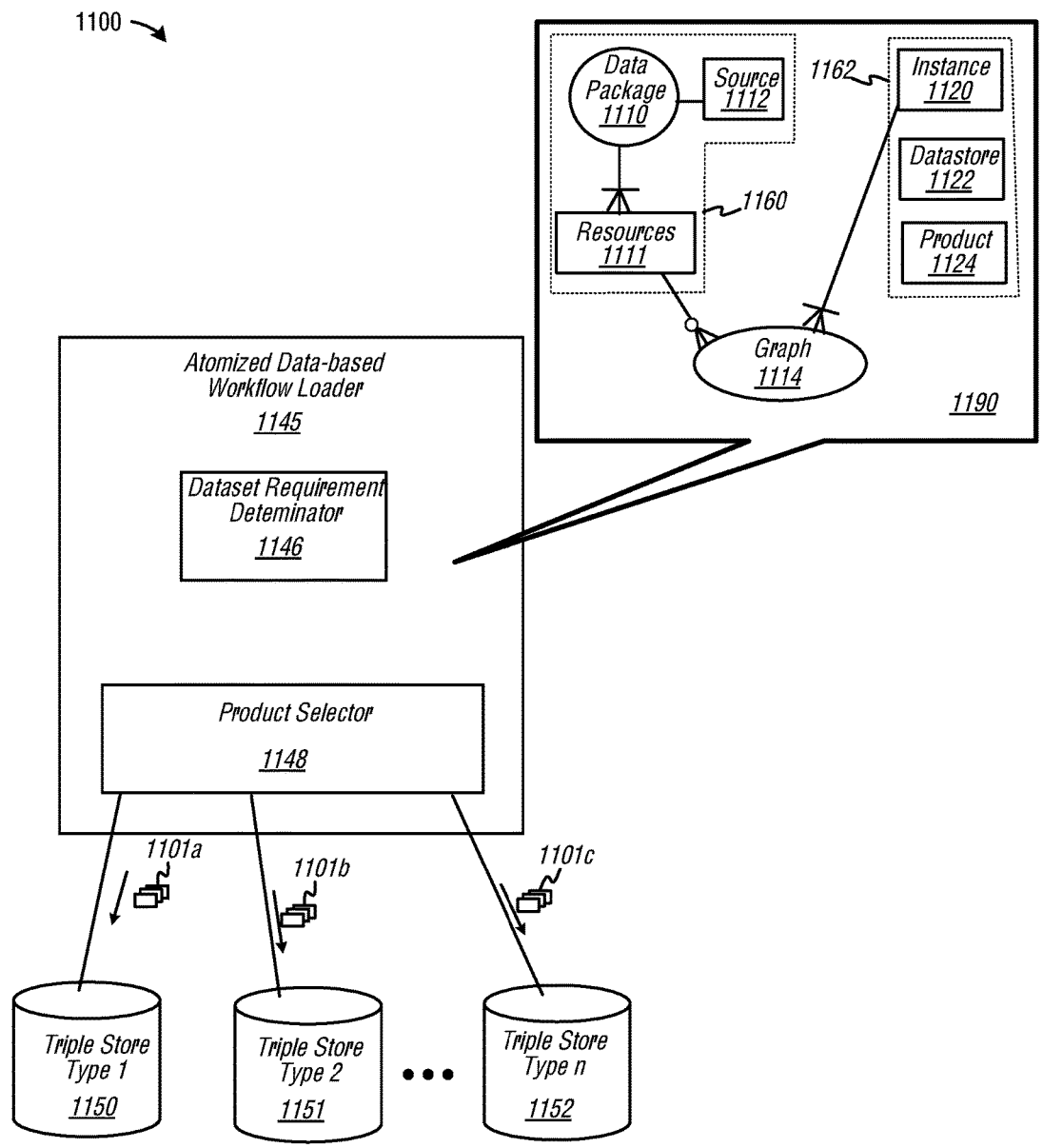
FIG. 11 is a diagram depicting an example of an atomized data-based workflow loader, according to various embodiments.

FIG. 11 is a diagram depicting an example of an atomized data-based workflow loader, according to various embodiments. Diagram 1100 depicts an atomized data-based workflow loader 1145 that is configured to determine which type of database or data store (e.g., triplestore) for a particular dataset that is be loaded. As shown, workflow loader 1145 includes a dataset requirement determinator 1146 and a product selector 1148. Dataset requirement determinator 1146 may be configured to determine the loading and/or query requirements for a particular dataset. For example, a particular dataset may include time-series data, GPU-related processing data, geo-spatial-related data, etc., any of which may be implemented optimally on data store 1150 (e.g., data store 1150 has certain product features that are well-suited for processing the particular dataset), but may be suboptimally implemented on data store 1152. Once the requirements are determined by dataset requirement determinator 1146, product selector 1148 is configured to select a product, such as triple store (type 1) 1150 for loading the dataset. Next, product selector 1148 can transmit the dataset 1101a for loading into product 1150. Examples of one or more of triplestores 1150 to 1152 may include one or more of a BLAZEGRAPH triplestore, a STARDOG triplestore, or a FUSEKI triplestore, all of which have been described above. Therefore, workflow loader 1145 may be configured to select BLAZEGRAPH triplestore, a STARDOG triplestore, or a FUSEKI triplestore based on each database's capabilities to perform queries in particular types of data and datasets.

Data model 1190 includes a data package representation 1110 that may be associated with a source 1112 (e.g., a dataset to be loaded) and a resource 1111 (e.g., data representations of a triplestore). Thus, data representation 1160 may model operability of "how to load" datasets into a graph 114, whereas data representation 1162 may model operability of "what to load." As shown, data representation 1162 may include an instance 1120, one or more references to a data store 1122, and one or more references to a product 1124. In at least one example, data representation 1162 may be equivalent to dataset requirement determinator 1146, whereas data representation 1160 may be equivalent to product selector 1148.

Figure 12:
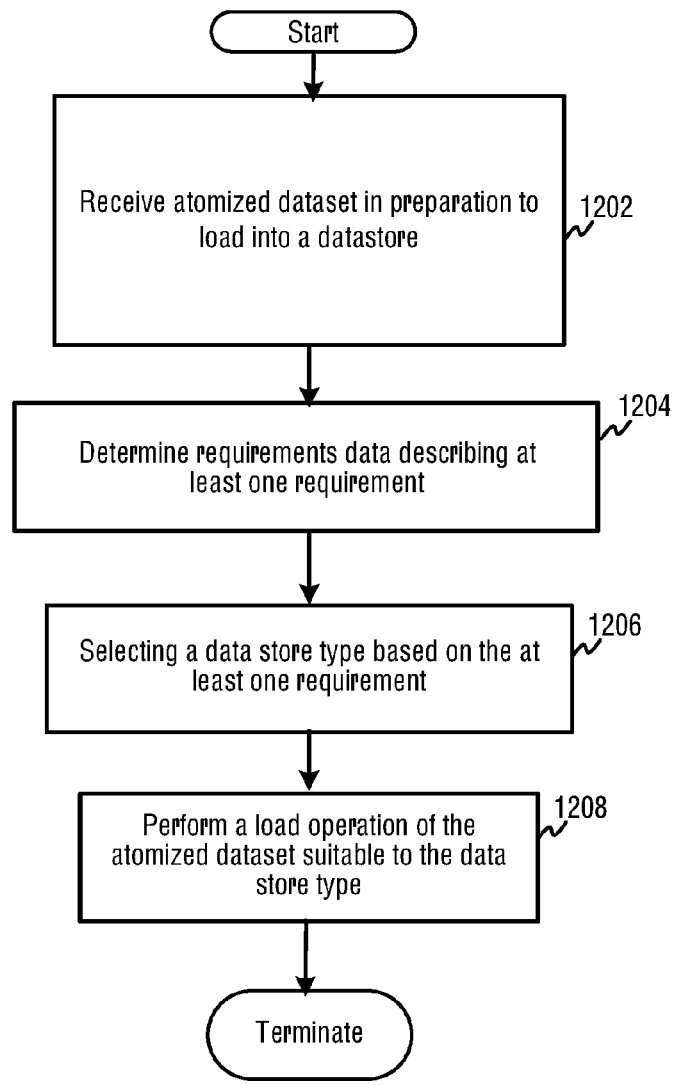
FIG. 12 is a diagram depicting a flow chart as an example of loading an atomized dataset into an atomized data point store, according to some embodiments.

FIG. 12 is a diagram depicting a flow chart as an example of loading an atomized dataset into an atomized data point store, according to some embodiments. Flow 1200 may begin at 1202, at which an atomized dataset (e.g., a triple) is received in preparation to load into a data store (e.g., a triplestore). At 1204, resource requirements data is determined to describe at least one resource requirement. For example, a resource requirement may describe one or more necessary abilities of a triplestore to optimal load and provide graph data. In at least one case, a dataset being loaded by a loader may be optimally used on particular type of data store (e.g., a triplestore configured optimally handle text searches, geo-spatial information, etc.). At 1206, a particular data store is selected based on an ability or capability of the particular data store to fulfill a requirement to operate an atomized data point store (or triplestore). At 1208, a load operation of the atomized dataset is performed into the data store.

Figure 13:
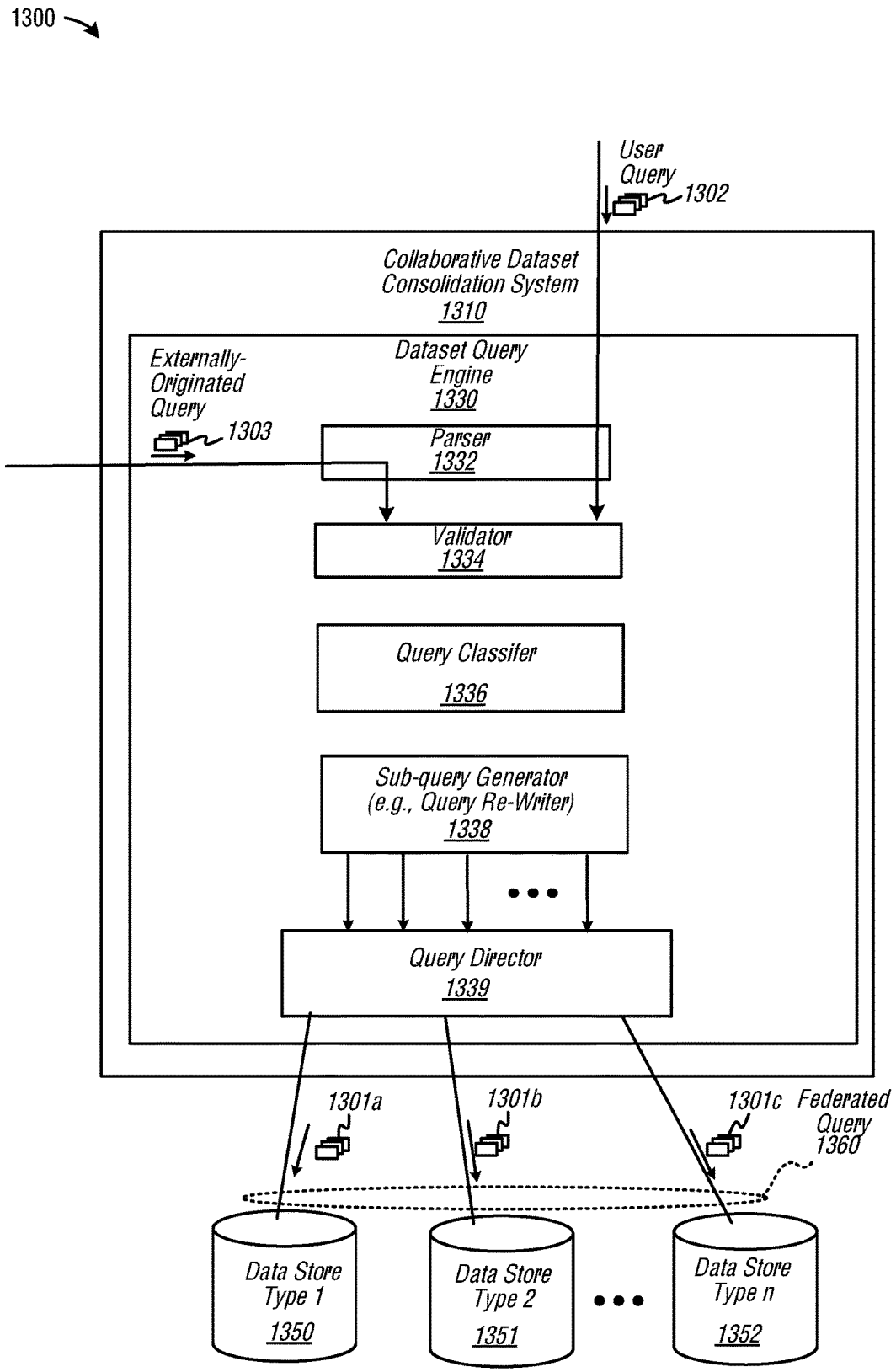
FIG. 13 is a diagram depicting an example of a dataset query engine, according to some embodiments.

FIG. 13 is a diagram depicting an example of a dataset query engine, according to some embodiments. Diagram 1300 shows a dataset query engine 1330 disposed in a collaborative dataset consolidation system 1310. According to some examples, elements depicted in diagram 1300 of FIG. 13 may include structures and/or functions as similarly-named or similarly-numbered elements depicted in other drawings. Dataset query engine 1330 may receive a query to apply to any number of atomized datasets in one or more repositories, such as data stores 1350, 1351, and 1352, within or without collaborative dataset consolidation system 1310. Repositories may include those that include linked external datasets (e.g., including imported external datasets, such if protected datasets are imported, whereby restrictions may remain (e.g., security logins)). In some cases, there may be an absence of standards with which to load and manage atomized datasets that may be loaded into disparate data stores. According to some examples, dataset query engine 1330 may be configured to propagate queries, such as queries 1301a, 1301b, and 1301c as a federated query 1360 of different datasets disposed over different data schema. Therefore, dataset query engine 1330 may be configured to propagate federated query 1360 over different triplestores, each of which may be architected to have different capabilities and functionalities to implement a triplestore.

According to one example, dataset query engine 1330 may be configured to analyze the query to classify portions to form classified query portions (e.g., portions of the query that are classified against categorization schema). Dataset query engine 1330 may be configured to re-write (e.g., partition) the query into a number of query portions based on, for example, the classification type of each query portion. Thus, dataset query engine 1330 may receive a query result from distributed data repositories, at least a portion of which may include disparate distributed triplestores.

In some cases, the query may originate as a user query 1302. That is, a user associated with the user account identifier may submit via a computing device user query 1302. In this case, user query 1302 may have been authenticated to access collaborative data consolidation system 1330 generally, or to the extent in which permissions and privileges have been granted as defined by, for example, data representing a user account. In other cases, the query may originate as an externally-originated query 1303. Here, an external computing device hosting an external dataset that is linked to an internal dataset (e.g., a dataset disposed in an internal data store 1350) may apply its query to data secretary engine 1330 (e.g., without user account-level authentication that typically is applied to user queries 1302). Note that dataset query engine 1330 may be configured to perform query-level authorization processes to ensure authorization of user queries 1302 and externally-originated queries 1303.

Further to diagram 1300, dataset query engine 1330 is shown to include a parser 1332, a validator 1334, a query classifier 1336, a sub-query generator 1338, and a query director 1339. According to some examples, parser 1332 may be configured to parse queries (e.g., queries 1302 and 1303) to, among other things, identify one or more datasets subject to the query. Validator 1334 may be configured to receive data representing the identification of each of the datasets subject to the query, and may be further configured to provide per-dataset authorization. For example, the level of authorization for applying queries 1302 and 1303 may be determined by analyzing each dataset against credentials or other authenticating data associated with a computing device or user applying the query. In one instance, if any authorization to access at least one dataset of any number of datasets (related to the query) may be sufficient to reject query.

Query classifier 1336 may be configured to analyze each of the identified datasets to classify each of the query portions directed to those datasets. Thus, a number of query portions may be classified the same or differently in accordance with a classification type. According to one classification type, query classifier 1336 may be configured to determine a type of repository (e.g., a type of data store, such as "type 1," "type 2," and "type n,") associated with a portion of a query, and classify a query portion to be applied the particular type of repository. In at least one example, the different types of repository may include different triplestores, such as a BLAZEGRAPH triplestore, a STARDOG triplestore, a FUSEKI triplestore, etc. Each type may indicate that each database may have differing capabilities or approaches to perform queries in a particular manner.

According to another classification type, query classifier 1336 may be configured to determine a type of query associated with a query portion. For example, a query portion may related to transactional queries, analytic queries regarding geo-spatial data, queries related to time-series data, queries related to text searches, queries related to graphic processing unit ("GPU")-optimized data, etc. In some cases, such types of data are loaded into specific types of repositories that are optimally-suited to provide queries of specific types of data. Therefore, query classifier 1336 may classify query portions relative to the types of datasets and data against which the query is applied. According to yet another classification type, query classifier 1336 may be configured to determine a type of query associated with a query portion to an external dataset. For example, a query portion may be identified as being applied to an external dataset. Thus, a query portion may be configured accordingly for application to them external database. Other classification query classification types are within the scope of the various embodiments and examples. In some cases, query classifier 1336 may be configured to classify a query with still yet another type of query based on whether a dataset subject to a query is associated with a specific entity (e.g., a user that owns the dataset, or an authorized user), or whether the dataset to be queried is secured such that a password or other authorization credentials may be required.

Sub-query generator 1338 may be configured to generate sub-queries that may be applied as queries 1301a to 130c, as directed by query director 1339. In some examples, sub-query generate 1338 may be configured to re-write queries 1302 and 1303 to apply portions of the queries to specific data stores 1350 to 1352 to optimize querying of data secretary engine 1330. According to some examples, query director 1339, or any component of dataset query engine 1330 (and including dataset query engine 1330), may be configured to implement SPARQL as maintained by the W3C Consortium, or any other compliant variant thereof. In some examples, dataset query engine 1330 may not be limited to the aforementioned and may implement any suitable query language. In some examples, dataset query engine 1330 or portions thereof may be implemented as a "query proxy" server or the like.

Figure 14:
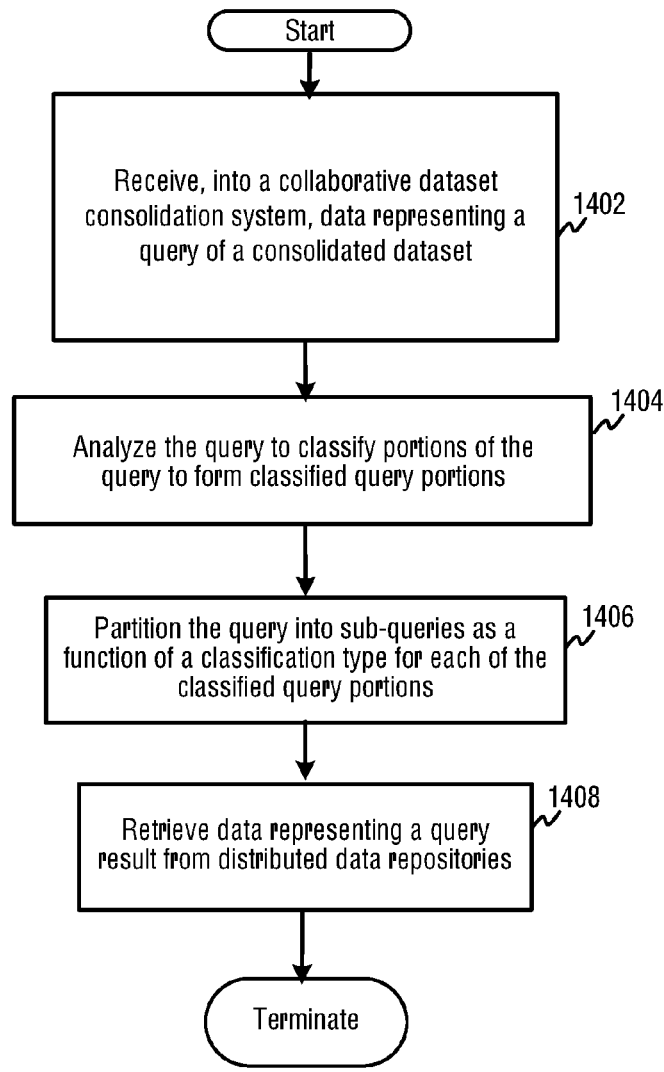
FIG. 14 is a diagram depicting a flow chart as an example of querying an atomized dataset stored in an atomized data point store, according to some embodiments.

FIG. 14 is a diagram depicting a flow chart as an example of querying an atomized dataset stored in an atomized data point store, according to some embodiments. Flow 1400 may begin at 1402, at which data representing a query of a consolidated dataset is received into a collaborative dataset consolidation system, the consolidated dataset being stored in an atomized data store. The query may apply to a number of of datasets formatted as atomized datasets that are stored in one or more atomized data stores (e.g., one or more triplestores). At 1404, the query is analyzed to classify portions of the query to form classified query portions. At 1406, the query may be partitioned (e.g., rewritten) into a number of queries or sub-queries as a function of a classification type. For example, each of the sub-queries may be rewritten or partitioned based on each of the classified query portions. For example, a sub-query may be re-written for transmission to a repository based on a type of repository describing the repository (e.g., one of any type of data store or database technologies, including one of any type of triplestore). At 1408, data representing a query result may be retrieved from distributed data repositories. In some examples, the query is a federated query of atomized data stores. A federated query may represent multiple queries (e.g., in parallel, or substantially in parallel), according to some examples. In one instance, a federated query may be a SPARQL query executed over a federated graph (e.g., a family of RDF graphs).

Figure 15:
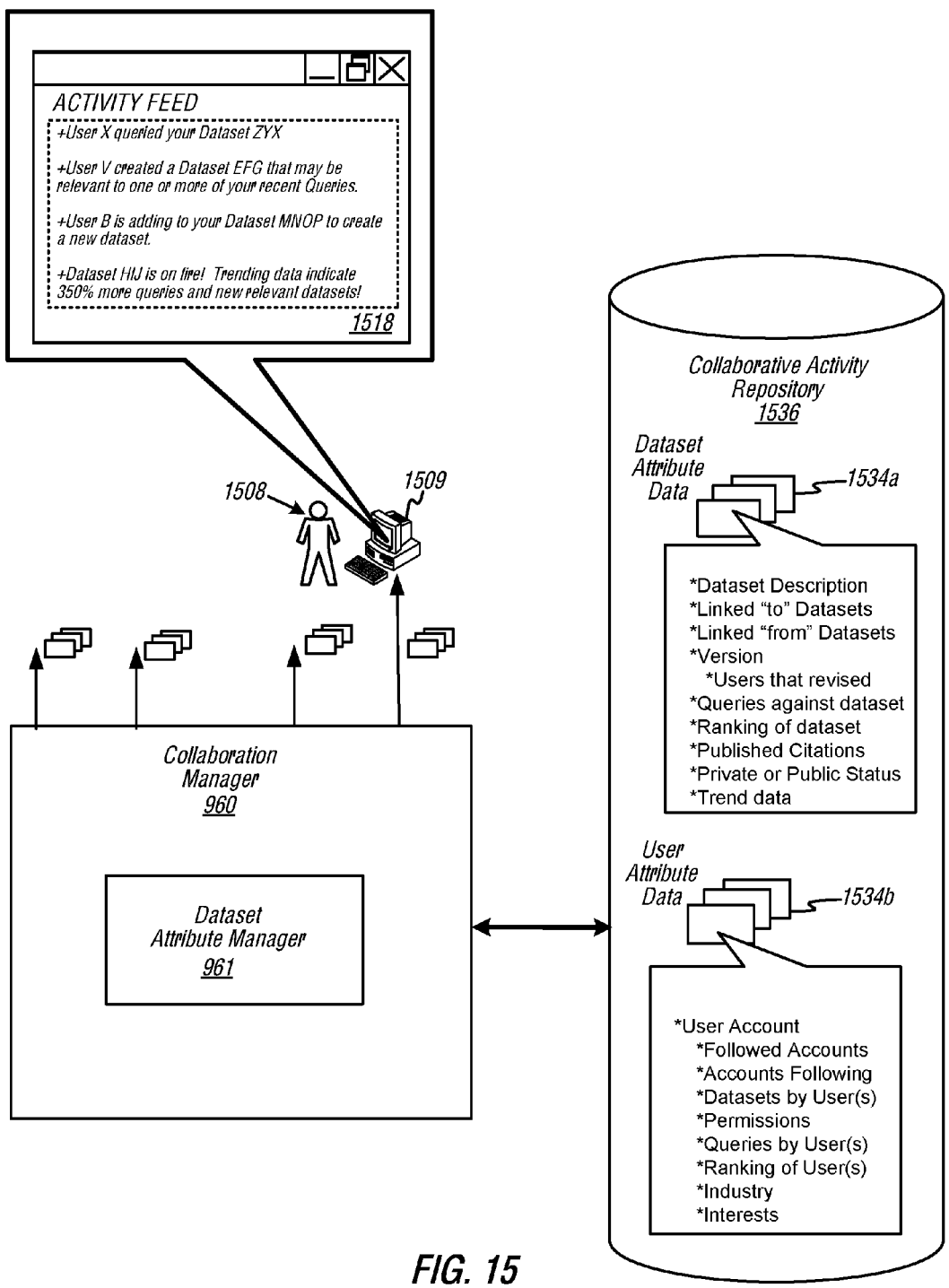
FIG. 15 is a diagram depicting an example of a collaboration manager configured to present collaborative information regarding collaborative datasets, according to some embodiments.

FIG. 15 is a diagram depicting an example of a collaboration manager configured to present collaborative information regarding collaborative datasets, according to some embodiments. Diagram 1500 depicts a collaboration manager 960 including a dataset attribute manager 961, and coupled to a collaborative activity repository 1536. In this example, dataset attribute manager 961 is configured to monitor updates and changes to various subsets of data representing dataset attribute data 1534a and various subsets of data representing user attribute data 1534b, and to identify such updates and changes. Further, dataset attribute manager 961 can be configured to determine which users, such as user 1508, ought to be presented with activity data for presentation via a computing device 1509 in a user interface 1518. In some examples, dataset attribute manager 961 can be configured to manage dataset attributes associated with one or more atomized datasets. For example, dataset attribute manager 961 can be configured to analyzing atomized datasets and, for instance, identify a number of queries associated with a atomized dataset, or a subset of account identifiers (e.g., of other users) that include descriptive data that may be correlated to the atomized dataset. To illustrate, consider that other users associated with other account identifiers have generated their own datasets (and metadata), whereby the metadata may include descriptive data (e.g., attribute data) that may be used to generate notifications to interested users of changes or modifications or activities related to a particular dataset. The notifications may be generated as part of an activity feed presented in a user interface, in some examples.

Collaboration manager 960 receives the information to be presented to a user 1508 and causes it to be presented at computing device 1509. As an example, the information presented may include a recommendation to a user to review a particular dataset based on, for example, similarities in dataset attribute data (e.g., users interested in Zika-based datasets generated in Brazil may receive recommendation to access a dataset with the latest dataset for Zika cases in Sao Paulo, Brazil). Note the listed types of attribute data monitored by dataset attribute manager 961 are not intended to be limiting. Therefore, collaborative activity repository 1536 may store other attribute types and attribute-related than is shown.

Figure 16:
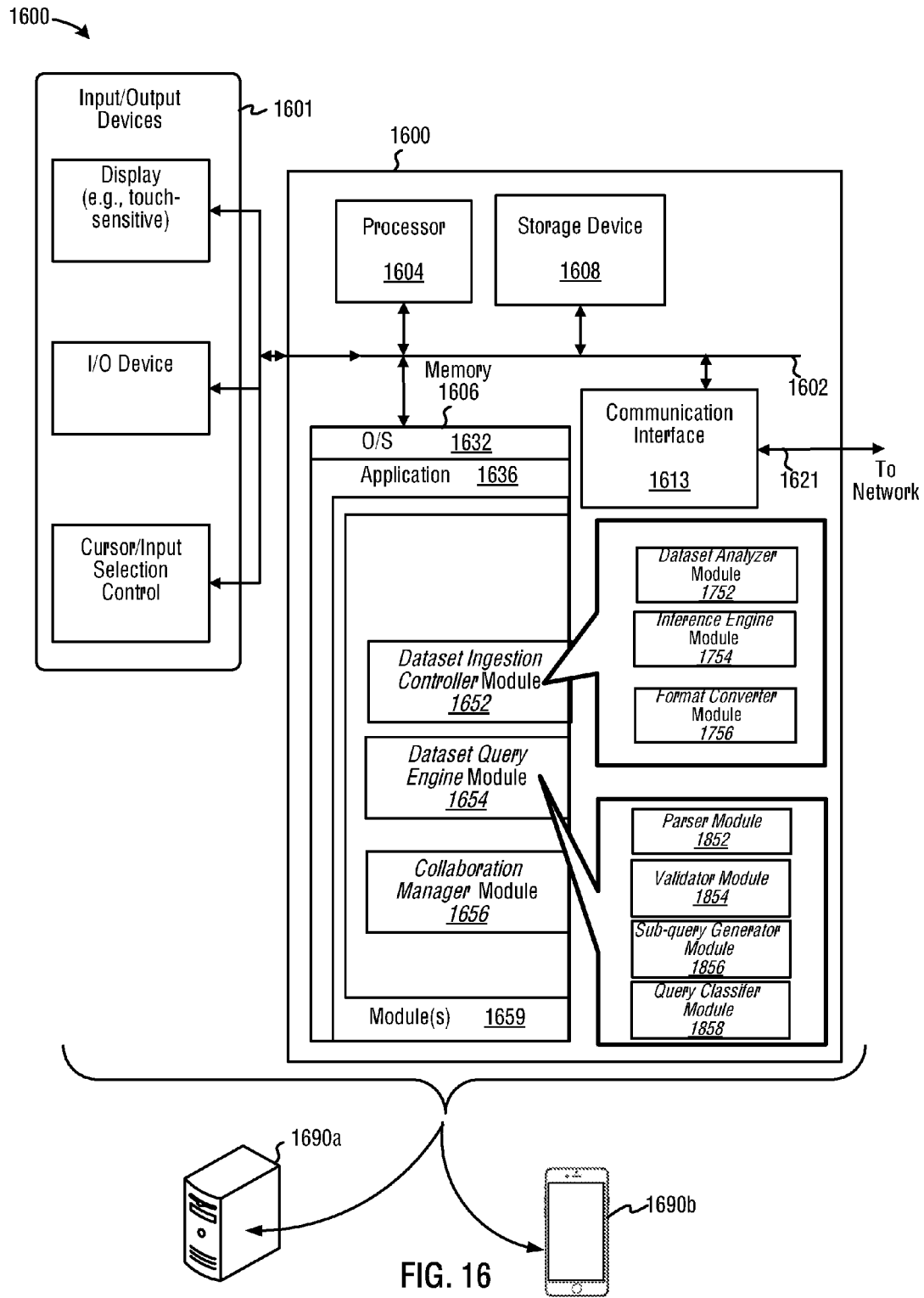
FIG. 16 illustrates examples of various computing platforms configured to provide various functionalities to components of a collaborative dataset consolidation system, according to various embodiments.

FIG. 16 illustrates examples of various computing platforms configured to provide various functionalities to components of a collaborative dataset consolidation system, according to various embodiments. In some examples, computing platform 1600 may be used to implement computer programs, applications, methods, processes, algorithms, or other software, as well as any hardware implementation thereof, to perform the above-described techniques.

In some cases, computing platform 1600 or any portion (e.g., any structural or functional portion) can be disposed in any device, such as a computing device 1690a, mobile computing device 1690b, and/or a processing circuit in association with forming and querying collaborative datasets generated and interrelated according to various examples described herein.

Computing platform 1600 includes a bus 1602 or other communication mechanism for communicating information, which interconnects subsystems and devices, such as processor 1604, system memory 1606 (e.g., RAM, etc.), storage device 1608 (e.g., ROM, etc.), an in-memory cache (which may be implemented in RAM 1606 or other portions of computing platform 1600), a communication interface 1613 (e.g., an Ethernet or wireless controller, a Bluetooth controller, NFC logic, etc.) to facilitate communications via a port on communication link 1621 to communicate, for example, with a computing device, including mobile computing and/or communication devices with processors, including database devices (e.g., storage devices configured to store atomized datasets, including, but not limited to triplestores, etc.). Processor 1604 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1600 exchanges data representing inputs and outputs via input-and-output devices 1601, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 1601 may be implemented as, or otherwise substituted with, a user interface in a computing device associated with a user account identifier in accordance with the various examples described herein.

According to some examples, computing platform 1600 performs specific operations by processor 1604 executing one or more sequences of one or more instructions stored in system memory 1606, and computing platform 1600 can be implemented in a client-server arrangement, peer-to-peer arrangement, or as any mobile computing device, including smart phones and the like. Such instructions or data may be read into system memory 1606 from another computer readable medium, such as storage device 1608. In some examples, hard-wired circuitry may be used in place of or in combination with software instructions for implementation. Instructions may be embedded in software or firmware. The term "computer readable medium" refers to any tangible medium that participates in providing instructions to processor 1604 for execution. Such a medium may take many forms, including but not limited to, non-volatile media and volatile media. Non-volatile media includes, for example, optical or magnetic disks and the like. Volatile media includes dynamic memory, such as system memory 1606.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1602 for transmitting a computer data signal.

In some examples, execution of the sequences of instructions may be performed by computing platform 1600. According to some examples, computing platform 1600 can be coupled by communication link 1621 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1600 may transmit and receive messages, data, and instructions, including program code (e.g., application code) through communication link 1621 and communication interface 1613. Received program code may be executed by processor 1604 as it is received, and/or stored in memory 1606 or other non-volatile storage for later execution.

In the example shown, system memory 1606 can include various modules that include executable instructions to implement functionalities described herein. System memory 1606 may include an operating system ("O/S") 1632, as well as an application 1636 and/or logic module(s) 1659. In the example shown in FIG. 16, system memory 1606 may include a dataset ingestion controller modules 1652 and/or its components (e.g., a dataset analyzer module 1752, an inference engine module 1754, and a format converter module 1756), any of which, or one or more portions of which, can be configured to facilitate any one or more components of a collaborative dataset consolidation system by implementing one or more functions described herein. Further, system memory 1606 may include a dataset query engine module 1654 and/or its components (e.g., a parser module 1852, a validator module 1854, a sub-query generator module 1856, and the query classifier module 1858), any of which, or one or more portions of which, can be configured to facilitate any one or more components of a collaborative dataset consolidation system by implementing one or more functions described herein. Additionally, system memory 1606 may include a collaboration manager module 1656 and/or any of its components that can be configured to facilitate any one or more components of a collaborative dataset consolidation system by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 1652, 1654, and 1656 of FIG. 16, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1659 (modules 1652, 1654, and 1656 of FIG. 16) or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1652, 1654, and 1656 of FIG. 16 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 1652, 1654, and 1656 of FIG. 16, or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:

receiving a data file including a dataset into a collaborative dataset consolidation system;

formatting the dataset to form a first atomized dataset including atomized data points each including data representing at least two objects and an association between the two objects;

forming a second atomized dataset including the first atomized dataset and one or more other atomized datasets;

receiving data representing a query into the collaborative dataset consolidation system, the query being associated with an identifier;

identifying a subset of the second atomized dataset relevant to the query, wherein portions of the second atomized dataset are disposed in different data repositories;

generating a plurality of sub-queries each of which is configured to access at least one of the different data repositories; and retrieving data representing query results from the at least one of the different data repositories.

2. The method of claim 1 wherein generating the plurality of sub-queries comprises:

classifying query portions.

3. The method of claim 2 wherein classifying the query portions comprises:

identifying a classification type for a portion of the query.

4. The method of claim 1 wherein the datasets comprise linked data points.

5. The method of claim 4 wherein linked data points comprise triples.

6. The method of claim 5 wherein at least one triple of the triples are formatted to comply with a Resource Description Framework ("RDF") data model.

* * * * *